(12) United States Patent
Jariwala et al.

(10) Patent No.: US 9,828,722 B2
(45) Date of Patent: *Nov. 28, 2017

(54) BLENDS OF FLUOROALKYL-CONTAINING ESTER OLIGOMERS WITH POLYCARBODIIMIDE(S)

(71) Applicant: 3M INNOVATIVE PROPERTIES COMPANY, St. Paul, MN (US)

(72) Inventors: Chetan P. Jariwala, Woodbury, MN (US); Cheryl L. S. Elsbernd, Woodbury, MN (US); Thomas M. Butler, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/638,244

(22) Filed: Mar. 4, 2015

(65) Prior Publication Data

US 2015/0176200 A1 Jun. 25, 2015

Related U.S. Application Data

(63) Continuation of application No. 12/602,888, filed as application No. PCT/US2008/066177 on Jun. 6, 2008, now Pat. No. 8,993,116.

(Continued)

(51) Int. Cl.
| | | |
|---|---|---|
| *C09D 167/00* | (2006.01) |
| *C09D 167/06* | (2006.01) |
| *C09D 175/06* | (2006.01) |
| *C09D 175/14* | (2006.01) |
| *C08G 18/38* | (2006.01) |
| *C08G 18/09* | (2006.01) |
| *C08G 18/67* | (2006.01) |
| *C08G 18/62* | (2006.01) |
| *C08G 63/00* | (2006.01) |
| *C08G 63/68* | (2006.01) |
| *C08G 63/682* | (2006.01) |
| *C08L 67/00* | (2006.01) |
| *C08L 67/06* | (2006.01) |
| *C08L 75/04* | (2006.01) |
| *C08L 75/06* | (2006.01) |
| *C08L 75/14* | (2006.01) |
| *D06M 15/19* | (2006.01) |
| *D06M 15/37* | (2006.01) |
| *D06M 15/507* | (2006.01) |
| *C08L 67/02* | (2006.01) |
| *C09D 167/02* | (2006.01) |
| *C09D 179/00* | (2006.01) |
| *C08L 79/00* | (2006.01) |
| *D06M 15/59* | (2006.01) |
| *C08J 7/04* | (2006.01) |
| *B05D 3/02* | (2006.01) |
| *B05D 7/24* | (2006.01) |
| *C08L 33/16* | (2006.01) |
| *C08L 61/28* | (2006.01) |
| *C08L 63/00* | (2006.01) |

(Continued)

(52) U.S. Cl.
CPC .......... *D06M 15/59* (2013.01); *B05D 3/0254* (2013.01); *B05D 7/24* (2013.01); *C08G 63/6826* (2013.01); *C08J 7/047* (2013.01); *C08L 67/02* (2013.01); *C08L 79/00* (2013.01); *C09D 167/02* (2013.01); *C09D 179/00* (2013.01); *C08G 18/09* (2013.01); *C08G 18/38* (2013.01); *C08G 18/62* (2013.01); *C08G 18/67* (2013.01); *C08G 63/00* (2013.01); *C08G 63/68* (2013.01); *C08G 63/682* (2013.01); *C08L 33/16* (2013.01); *C08L 61/28* (2013.01); *C08L 63/00* (2013.01); *C08L 67/00* (2013.01); *C08L 67/06* (2013.01); *C08L 75/04* (2013.01); *C08L 75/06* (2013.01); *C08L 75/14* (2013.01); *C09D 167/00* (2013.01); *C09D 167/06* (2013.01); *C09D 175/06* (2013.01); *C09D 175/14* (2013.01); *D06M 15/19* (2013.01); *D06M 15/37* (2013.01); *D06M 15/507* (2013.01); *D06M 2101/32* (2013.01); *D06M 2101/34* (2013.01); *Y10T 428/31551* (2015.04); *Y10T 428/31786* (2015.04); *Y10T 442/2164* (2015.04); *Y10T 442/2172* (2015.04); *Y10T 442/2189* (2015.04)

(58) Field of Classification Search
None
See application file for complete search history.

(56) References Cited

U.S. PATENT DOCUMENTS 2,803,615 A  8/1957  Ahlbrecht et al.
2,941,983 A  6/1960  Smeltz (Continued)

FOREIGN PATENT DOCUMENTS

EP  0 113 217  7/1984
EP  0 526 976 A1  2/1993

(Continued)

OTHER PUBLICATIONS

Sandler et al., "Chapter 9 / Carbodiimides", Org. Functional Group Prep., (1971), pp. 205-222, vol. 2.
Banks Ed., "Organofluorine Chemicals and Their Industrial Applications", (1979), pp. 226-234, Ellis Horwood Ltd., Chichester, England.
Wicks et al., "Blocked Isocyanates III: Part A. Mechanisms and Chemistry", Progress in Organic Coatings, (1999), pp. 148-172, vol. 36, Elsevier Science S.A.

(Continued)

*Primary Examiner* — Vivian Chen

(57) ABSTRACT

For imparting enhanced water-repellency and oil-repellency properties to substrates compositions comprising blends of (A) one or more ester oligomers and (B) one or more polycarbodiimides. Also methods for applying such compositions and articles treated with such compositions.

18 Claims, No Drawings

Related U.S. Application Data

(60) Provisional application No. 60/942,701, filed on Jun. 8, 2007, provisional application No. 60/942,719, filed on Jun. 8, 2007.

(51) Int. Cl.
*D06M 101/32* (2006.01)
*D06M 101/34* (2006.01)

(56) References Cited

U.S. PATENT DOCUMENTS

| | | |
|---|---|---|
| 2,941,988 A | 6/1960 | Wolf |
| 3,068,187 A | 12/1962 | Bolstad et al. |
| 3,094,547 A | 6/1963 | Heine |
| 3,102,103 A | 8/1963 | Ahlbrecht et al. |
| 3,341,497 A | 9/1967 | Sherman et al. |
| 3,450,562 A | 6/1969 | Hoeschele |
| 3,574,791 A | 4/1971 | Sherman et al. |
| 3,755,242 A | 8/1973 | Reich |
| 3,862,989 A | 1/1975 | Hansen |
| 3,896,251 A | 7/1975 | Landucci |
| 3,916,053 A | 10/1975 | Sherman et al. |
| 3,987,182 A | 10/1976 | Gold |
| 3,987,227 A | 10/1976 | Schultz et al. |
| 4,024,178 A | 5/1977 | Landucci |
| 4,085,137 A | 4/1978 | Mitsch et al. |
| 4,215,205 A | 7/1980 | Landucci |
| 4,426,466 A | 1/1984 | Schwartz |
| 4,468,527 A | 8/1984 | Patel |
| 4,487,964 A | 12/1984 | Watson, Jr. et al. |
| 4,504,401 A | 3/1985 | Matsuo et al. |
| 4,508,916 A | 4/1985 | Newell et al. |
| 4,529,658 A | 7/1985 | Schwartz et al. |
| 4,540,497 A | 9/1985 | Chang et al. |
| 4,560,487 A | 12/1985 | Brinkley |
| 4,566,981 A | 1/1986 | Howells |
| 4,587,301 A | 5/1986 | Watson, Jr. et al. |
| 4,606,737 A | 8/1986 | Stern |
| 4,668,406 A | 5/1987 | Chang |
| 4,668,726 A | 5/1987 | Howells |
| 4,958,039 A | 9/1990 | Pechhold |
| 4,977,219 A | 12/1990 | Watson, Jr. |
| 5,025,052 A | 6/1991 | Crater et al. |
| 5,115,072 A | 5/1992 | Nava |
| 5,132,028 A | 7/1992 | Nagase et al. |
| 5,216,097 A | 6/1993 | Allewaert et al. |
| 5,276,175 A | 1/1994 | Dams et al. |
| 5,292,796 A | 3/1994 | Dams |
| 5,371,148 A | 12/1994 | Taylor |
| 5,414,102 A | 5/1995 | Pohmer et al. |
| 5,424,474 A | 6/1995 | Pohmer et al. |
| 5,451,622 A | 9/1995 | Boardman et al. |
| 5,453,540 A | 9/1995 | Dams |
| 5,688,884 A | 11/1997 | Baker et al. |
| 5,725,789 A | 3/1998 | Huber et al. |
| 5,817,249 A | 10/1998 | Audenaert et al. |
| 5,929,188 A | 7/1999 | Nakamura |
| 6,037,429 A | 3/2000 | Linert et al. |
| 6,204,342 B1 | 3/2001 | Nava |
| 6,251,984 B1 | 6/2001 | Shimada |
| 6,288,157 B1 | 9/2001 | Jariwala |
| 6,376,592 B1 | 4/2002 | Shimada et al. |
| 6,472,476 B1 | 10/2002 | Soane |
| 6,525,127 B1 | 2/2003 | Jariwala et al. |
| 6,586,522 B1 | 7/2003 | Jariwala |
| 6,753,380 B2 * | 6/2004 | Qiu .................. C07C 311/09 428/357 |
| 6,960,642 B2 | 11/2005 | Jariwala |
| 7,049,379 B2 | 5/2006 | Jariwala |
| 7,199,197 B2 | 4/2007 | Caldwell et al. |
| 7,214,736 B2 | 5/2007 | Audenaert et al. |
| 7,425,279 B2 | 9/2008 | Cote |
| 7,750,093 B2 | 7/2010 | Elsbernd |
| 7,759,447 B2 | 7/2010 | Kinney |
| 8,076,445 B2 | 12/2011 | Porzio |
| 8,440,779 B2 | 5/2013 | Audenaert |
| 8,821,984 B2 | 9/2014 | Jariwala |
| 8,993,116 B2 * | 3/2015 | Jariwala ............ C08G 63/6826 428/423.1 |
| 2004/0077237 A1 | 4/2004 | Audenaert |
| 2006/0094851 A1* | 5/2006 | Audenaert ........... C07C 267/00 528/44 |
| 2007/0112161 A1 | 5/2007 | Roesler |
| 2008/0306238 A1 | 12/2008 | Jariwala |
| 2010/0227148 A1 | 9/2010 | Jariwala et al. |

FOREIGN PATENT DOCUMENTS

| | | |
|---|---|---|
| JP | 59-135219 | 8/1984 |
| JP | 06-220718 | 8/1994 |
| JP | 10-251511 | 9/1998 |
| JP | 11-060667 | 3/1999 |
| JP | 2004-531598 | 10/2004 |
| WO | WO 9951430 | 10/1999 |
| WO | WO 02072537 | 9/2002 |

OTHER PUBLICATIONS

Williams et al., "Carbodiimide Chemistry: Recent Advances", Chemical Reviews, (1981), pp. 589-636, vol. 81, No. 4, Amercian Chemical Society.

Campbell et al., "Carbodiimides. IV. High Polymers Containing the Carbodiimide Repeat Unit", Journal of Organic Chemistry, (Aug. 1963), pp. 2069-2075, vol. 28.

Wagner et al., "α,ω-Diisocyanatocarbodiimides, -Polycarbodiimides, and Their Derivatives", Angewandte Chemie International Edition in English, (Oct. 1981), pp. 819-830, vol. 20, No. 10, Verlag Chemie GmbH, 6940 Weinheim.

AATCC Test Method 118-1983, "Oil Repellency: Hydrocarbon Resistance Test", An American National Standard, (1983).

AATCC Test Method 22-1996, "Water Repellency: Spray Test",AATCC Technical Manual/2001, (2001).

Bundesmann Test Method, DIN 53 888, Feb. 1979.

* cited by examiner

BLENDS OF FLUOROALKYL-CONTAINING ESTER OLIGOMERS WITH POLYCARBODIIMIDE(S)

CROSS REFERENCE TO RELATED APPLICATIONS

This application is a continuation of U.S. patent application Ser. No. 12/602,888, filed on Dec. 3, 2009 U.S. Pat. No. 8,993,116, which is a national stage filing of 35 U.S.C. §371 of PCT/US2008/066177, filed Jun. 6, 2008, which claims priority to U.S. Provisional Application No. 60/942,719, filed Jun. 8, 2007, and U.S. Provisional Application 60/942,701, filed Jun. 8, 2007, the disclosures of which are incorporated by reference in their entirety herein.

FIELD OF THE INVENTION

This invention relates to fluorochemical compositions comprising blends of (A) one or more compounds or oligomers having at least one fluorine-containing repeatable unit and at least one fluorine-containing terminal group blended with (B) one or more polydicarbodiimide(s) (i.e., polycarbodiimide(s)). This invention also relates to articles comprising a substrate and such fluorochemical compositions, which may be applied as a coating. These fluorochemical compositions impart oil and water repellency to the substrate. In other aspects, this invention relates to processes for imparting oil and water repellency characteristics to substrates and articles.

BACKGROUND OF THE INVENTION

The use of certain fluorochemical compositions on fibers and fibrous substrates, such as textiles, paper, and leather, to impart oil- and water-repellency and soil- and stain-resistance is well known in the art. See, for example, Banks, Ed., *Organofluorine Chemicals and Their Industrial Applications*, Ellis Horwood Ltd., Chichester, England, 1979, pp. 226-234. Such fluorochemical compositions include, for example, fluorochemical guanidines (U.S. Pat. No. 4,540,497 (Chang et al.)), compositions of cationic and non-cationic fluorochemicals (U.S. Pat. No. 4,566,981 (Howells)), compositions containing fluorochemical carboxylic acid and epoxidic cationic resin (U.S. Pat. No. 4,426,466 (Schwartz)), fluoroaliphatic carbodiimides (U.S. Pat. No. 4,215,205 (Landucci)), fluoroaliphatic alcohols (U.S. Pat. No. 4,468,527 (Patel)), fluorine-containing addition polymers, copolymers, and macromers (U.S. Pat. Nos. 2,803,615; 3,068,187; 3,102,103; 3,341,497; 3,574,791; 3,916,053; 4,529,658; 5,216,097; 5,276,175; 5,725,789; and 6,037,429), fluorine-containing phosphate esters (U.S. Pat. Nos. 3,094,547; 5,414,102; and 5,424,474), fluorine-containing urethanes (U.S. Pat. Nos. 3,987,182; 3,987,227; 4,504,401; and 4,958,039), fluorochemical allophanates (U.S. Pat. No. 4,606,737) fluorochemical biurets (U.S. Pat. No. 4,668,406), fluorochemical oxazolidinones (U.S. Pat. No. 5,025,052), and fluorochemical piperazines (U.S. Pat. No. 5,451,622).

A need exists for repellent treatments that provide improved ease of use and improved performance under desired conditions.

SUMMARY OF INVENTION

This invention relates to fluorochemical ester compositions comprising blends of (A) one or more fluorochemical esters such as those disclosed in US Patent Publication No. 2008/0306238 and those disclosed in U.S. Pat. No. 6,753,380 (Qiu) with (B) one or more polycarbodiimide(s). Such blends have been found to impart excellent dynamic water repellent properties and increased durability to wear and laundering to substrates to which they are applied.

In addition, blends of the invention may further comprise (C) additional materials to optimize properties and performance as desired. For instance, blends of the invention may further comprise oligomers, polymers, or copolymers of fluoroalkyl acrylates, e.g., those described in U.S. Pat. No. 7,199,197; urethanes, e.g., derived from oligomeric fluoroacrylates such as described in U.S. Publication No. 2007/0004895; melamines; etc.

Compositions of the invention comprise one or more oligomers having at least one fluorine-containing repeatable unit and at least one fluorine-containing terminal group. These oligomers comprise the condensation reaction product of:

(a) one or more polyols;
(b) one or more polyacyl compounds (such as carboxylic acids, esters, acyl halides), e.g., preferably 14 or more carbon atoms; and
(c) one or more monofunctional fluorine-containing compounds comprising a functional group that is reactive with the hydroxyl group of the polyol (a) or with the acyl group of the polyacyl compound (b);

wherein at least a portion of the polyol compounds further comprise at least one fluorine-containing group selected from the group consisting of perfluoroalkyl, perfluoroheteroalkyl, and perfluoroheteroalkylene. In some embodiments, the compounds or oligomers comprise the condensation reaction product of (a), (b), and (c) as described above and (d) one or more monofunctional non-fluorine-containing compounds. Oligomers of the invention have been surprisingly found to provide superior performance as compared to previously known shorter chain materials, particularly initial and durable dynamic water repellency performance.

As used herein, the term "oligomer" means a molecule comprising at least 2 or more, up to a few, i.e., up to an average of 10, but preferably up to an average of 5, repeating (polymerized) or repeatable units. Each repeating unit comprises an ester group that is derived or derivable from the reaction of at least one polyol having an average of greater than one, preferably two or more hydroxyl moieties; and at least one polyacyl compound having an average of greater than one, preferably two or more acyl moieties, wherein at least a portion of the polyol compounds further comprises at least one fluorine-containing moiety, selected from the group consisting of perfluoroalkyl, perfluoroalkylene, perfluoroheteroalkyl, and perfluoroheteroalkylene. The oligomer is terminated with one or more perfluoroalkyl groups, one or more perfluoroheteroalkyl groups, or mixtures thereof.

Certain preferred embodiments of the fluorochemical compositions of the present invention include those compositions comprising terminal and pendant $R^f$ groups having from 1 to 12 carbons, preferably 6 or fewer carbons, and more preferably 3 to 5 carbons.

Another embodiment of the present invention relates to a coating composition comprising the fluorochemical oligomer of the present invention and a solvent. In this embodiment, the fluorochemical composition is dissolved or dispersed in the solvent. When applied to a substrate, this coating composition (which might be a solution or emulsion) provides a uniform distribution of the chemical composition on the substrate without altering the appearance of the substrate. This invention further relates to a method for imparting water- and oil-repellency, stain-release, or stain-resistance characteristics to a substrate, comprised of one or more surfaces, comprising the steps of:

(a) applying the coating composition of the present invention onto one or more surfaces of the substrate wherein the coating composition comprises:
(i) at least one solvent; and
(ii) the fluorochemical composition of the invention; and
(b) curing the coating composition.

The fluorochemical compositions of the present invention can be applied as coatings to a wide variety of substrates, for example, by topical application, to impart oil- and water-repellency, stain-release, and stain-resistant properties to the substrates. In testing substrates coated with the fluorochemical compositions of the present invention, unexpectedly high dynamic water repellency has been observed. When applied as a coating, the chemical compositions of the present invention can provide a uniform film. Applied as a coating, the chemical compositions of the present invention do not change the appearance of the substrate to which they are applied.

Blends of the invention consisting essentially of (A) one or more ester oligomers as described herein and (B) one or more polycarbodiimides as described herein have been found to impart surprisingly good initial water-repellency and oil-repellency properties. Blends of the invention further comprising (C) one or more melamine condensates as described herein have been found to impart such surprisingly good initial properties with improved durability of such properties, i.e., retention of good water-repellency and oil-repellency properties after laundering; such blends with the further addition of fluorochemical acrylates have been found to impart still further improvement to durability of repellency properties.

DETAILED DESCRIPTION OF ILLUSTRATIVE EMBODIMENTS

Definitions

Unless otherwise stated, the following terms used in the specification and claims have the meanings given below:

"Acyloxy" means a radical —OC(O)R where R is alkyl, alkenyl, and cycloalkyl, e.g., acetoxy, 3,3,3-trifluoroacetoxy, propionyloxy, and the like.

"Alkenyl" means an unsaturated aliphatic radical.

"Alkoxy" means a radical —OR where R is an alkyl group, e.g., methoxy, ethoxy, propoxy, butoxy, and the like.

"Alkyl" means a linear saturated monovalent hydrocarbon radical or a branched saturated monovalent hydrocarbon radical, e.g., methyl, ethyl, 1-propyl, 2-propyl, pentyl, and the like.

"Alkylene" means a linear saturated divalent hydrocarbon radical or a branched saturated divalent hydrocarbon radical, e.g., methylene, ethylene, propylene, 2-methylpropylene, pentylene, hexylene, and the like.

"Aralkylene" means an alkylene radical defined above with an aromatic group attached to the alkylene radical, e.g., benzyl, pyridylmethyl, 1-naphthylethyl, and the like.

"Cured chemical composition" means that the chemical composition is dried or solvent has evaporated from the chemical composition under elevated temperature (e.g., 50° C. or higher) until dryness, up to approximately 24 hours.

"Fibrous substrate" means materials comprised of synthetic or inorganic fibers such as wovens, knits, nonwovens, carpets, and other textiles including laminates (PTFE and/or PU); and materials comprised of natural fibers such as cotton, paper, and leather.

"Fluorocarbon monoalcohol" means a compound having one hydroxyl group and a perfluoroalkyl or a perfluoroheteralkyl group, e.g., $C_4F_9SO_2N(CH_3)CH_2CH_2OH$, $C_4F_9CH_2CH_2OH$, $C_2F_5O(C_2F_4O)_3CF_2CONHC_2H_4OH$, $C_3F_7O(C_3F_6O)_nCF(CF_3)CONHC_2H_4OH$, c-$C_6F_{11}CH_2OH$, and the like.

"Hard substrate" means any rigid material that maintains its shape, e.g., glass, ceramic, concrete, natural stone, wood, metals, plastics, and the like.

"Heteroacyloxy" has essentially the meaning given above for acyloxy except that one or more heteroatoms (i.e., oxygen, sulfur, and/or nitrogen) may be present in the R group and the total number of carbon atoms present may be up to 50, e.g., $CH_3CH_2OCH_2CH_2C(O)O$—, $C_4H_9OCH_2CH_2OCH_2CH_2C(O)O$—, $CH_3O(CH_2CH_2O)_nCH_2CH_2C(O)O$—, and the like.

"Heteroalkoxy" has essentially the meaning given above for alkoxy except that one or more heteroatoms (i.e. oxygen, sulfur, and/or nitrogen) may be present in the alkyl chain and the total number of carbon atoms present may be up to 50, e.g., $CH_3CH_2OCH_2CH_2O$—, $C_4H_9OCH_2CH_2OCH_2CH_2O$—, $CH_3O(CH_2CH_2O)_nH$, and the like.

"Heteroalkyl" has essentially the meaning given above for alkyl except that one or more heteroatoms (i.e., oxygen, sulfur, and/or nitrogen) may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4F_9CH_2CH_2SCH_2CH_2$—, and the like.

"Heteroalkylene" has essentially the meaning given above for alkylene except that one or more heteroatoms (i.e. oxygen, sulfur, and/or nitrogen) may be present in the alkylene chain, these heteroatoms being separated from each other by at least one carbon, e.g., —$CH_2OCH_2O$—, —$CH_2CH_2OCH_2CH_2$—, —$CH_2CH_2N(CH_3)CH_2CH_2$—, —$CH_2CH_2SCH_2CH_2$—, and the like.

"Heteroaralkylene" means an aralkylene radical defined above except that catenated oxygen, sulfur, and/or nitrogen atoms may be present, e.g., phenyleneoxymethyl, phenyleneoxyethyl, benzyleneoxymethyl, and the like.

"Halo" means fluoro, chloro, bromo, or iodo, preferably fluoro and chloro.

"Perfluoroalkyl" has essentially the meaning given above for "alkyl" except that all or essentially all of the hydrogen atoms of the alkyl radical are replaced by fluorine atoms and the number of carbon atoms is from 1 to about 12, e.g., perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g., $CF_3CF_2OCF_2CF_2$—, $CF_3CF_2O(CF_2CF_2O)_3CF_2CF_2$—, or $C_3F_7O(CF(CF_3)CF_2O)_mCF(CF_3)CF_2$— where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, e.g., —CF$_2$OCF$_2$—, —CF$_2$O (CF$_2$O)$_n$(CF$_2$CF$_2$O)$_m$CF$_2$—, and the like.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyacyl compound" means a compound containing two or more acyl groups, or derivative thereof, such as carboxylic acid, ester, or acyl halide, attached to a multivalent organic group, e.g. dimethyl adipate, and the like.

"Polyol" means an organic compound or polymer with an average of at least about 2 primary or secondary hydroxyl groups per molecule, e.g., ethylene glycol, propylene glycol, 1,6-hexanediol, and the like. The compound or polymer may be fluorinated, i.e., comprising fluorine-containing moieties in the backbone or attached pendantly or both.

"Porous" means capable of imbibing a liquid.

Esters—(A)

The fluorochemical compositions of the present invention comprise the condensation reaction product of:
(a) one or more fluorinated polyols;
(b) one or more polyacyl compounds (such as carboxylic acids, esters, acyl halides) preferably containing 14 or more carbon atoms; and
(c) one or more monofunctional fluorine-containing compounds comprising a functional group that is reactive with the hydroxyl group of the polyol (a) or the acyl group of the polyacyl compound (b).

The fluorinated polyol compounds further comprise at least one fluorine-containing group selected from the group consisting of perfluoroalkyl, perfluoroheteroalkyl, and perfluoroheteroalkylene. The ester oligomers may further comprise one or more non-fluorinated polyols. Optionally, the reaction mixture of fluorochemical oligomers of the invention further comprises, in addition to (a), (b), and (c), (d) one or more monofunctional non-fluorine-containing compounds to adjust such properties as resultant repellency, melting point, etc.

The oligomer comprises at least two repeatable or repeating polymerized units. Each repeatable or repeating unit comprises one or more pendant or in-chain fluorine-containing groups selected from the group consisting of perfluoroalkyl, perfluoroalkylene, perfluoroheteroalkyl, and perfluoroheteroalkylene, and an ester group that is formed from the reaction between a polyol and a polyacyl compound. The oligomer is terminated with one or more perfluoroalkyl groups, one or more perfluoroheteroalkyl groups, or optionally one or more non-fluorine containing compounds or a mixture thereof.

It will be understood that the resultant mixture of ester molecules preferably comprises ester molecules having a varying number of repeating or repeatable units, including two and more repeating units. This mixture of ester molecules comprising a varying number of repeating units allows simple blending of the above components in preparing the fluorochemical composition.

The fluorochemical composition of the present invention comprises a mixture of ester molecules arising from the reaction of at least one diacyl compound (or a derivative thereof, for example, a dicarboxylic acid halide, a dicarboxylic acid anhydride, or a dicarboxylic acid ester), at least one fluorinated polyol, and at least one fluorine-containing monoalcohol or fluorine-containing monocarboxylic acid (or derivative), with the proviso that at least a portion of the polyol compounds is comprised of a pendant or in-chain fluorine-containing group.

Thus, the fluorochemical composition can comprise a single ester oligomer having a certain number of the specified repeating or repeatable units (a number greater than or equal to one), or it can comprise a mixture of such compounds and/or oligomers of varying numbers of repeat units.

The ester compounds and oligomers may be represented by the following formula (I):

$$R^fQ[OR]_o[OC(O)R^1C(O)OR^2O]_n[C(O)R^1C(O)]_mT \quad (I)$$

wherein:
o is a number from 0 to 1 inclusive;
n is a number from 1 to 10 inclusive;
m is a number from 0 to 1 inclusive;
$R^f$ is a perfluoroalkyl group having 1 to 12, preferably 6 or fewer, most preferably 3 to 5 carbon atoms, or a perfluoroheteroalkyl group having 3 to about 50 carbon atoms with all perfluorocarbon chains present having 1 to 6, preferably 1 to 4 carbon atoms;
Q is a divalent linking group;
$R^1$ is the same or different and is a polyvalent organic group that is a residue of a polyacyl compound, that is a straight or branched or unsaturated chain alkylene group of 1 to 20 carbon atoms, most preferably 12-16 carbon atoms;
$R^2$ is the same or different divalent organic group that is a residue of the polyol, at least a portion of which are substituted with or contain one or more perfluoroalkyl groups, perfluoroheteroalkyl groups, perfluoroheteroalkylene groups, or mixtures thereof wherein preferably no more than 6 carbon atoms have a fluorine atom bonded thereto; and
T is either $QR^f$ as defined above or a non-fluorine containing monofunctional compound capable of reacting with a polyacyl compound or a polyol.

With respect to the above-described $R^f$ groups, it is preferred that the $R^f$ group have 6 or fewer carbon atoms. It is believed that the shorter-chain $R^f$ groups have a reduced tendency to bioaccumulate as described in U.S. Pat. No. 5,688,884.

Suitable linking groups Q include the following structures in addition to a covalent bond. For the purposes of this list, each k is independently an integer from 0 to about 20, $R^{1'}$ is hydrogen, phenyl, or alkyl of 1 to about 4 carbon atoms, and $R^{2'}$ is alkyl of 1 to about 20 carbon atoms. Each structure is non-directional, i.e., —(CH$_2$)$_k$C(O)O— is equivalent to —O(O)C(CH$_2$)$_k$—.

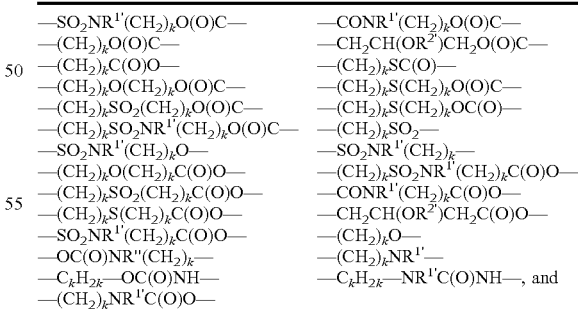

—SO$_2$NR$^{1'}$(CH$_2$)$_k$O(O)C—
—(CH$_2$)$_k$O(O)C—
—(CH$_2$)$_k$C(O)O—
—(CH$_2$)$_k$O(CH$_2$)$_k$O(O)C—
—(CH$_2$)$_k$SO$_2$(CH$_2$)$_k$O(O)C—
—(CH$_2$)$_k$SO$_2$NR$^{1'}$(CH$_2$)$_k$O(O)C—
—SO$_2$NR$^{1'}$(CH$_2$)$_k$O—
—(CH$_2$)$_k$O(CH$_2$)$_k$C(O)O—
—(CH$_2$)$_k$SO$_2$(CH$_2$)$_k$C(O)O—
—(CH$_2$)$_k$S(CH$_2$)$_k$C(O)O—
—SO$_2$NR$^{1'}$(CH$_2$)$_k$C(O)O—
—OC(O)NR''(CH$_2$)$_k$—
—C$_k$H$_{2k}$—OC(O)NH—
—(CH$_2$)$_k$NR$^{1'}$C(O)O—
—CONR$^{1'}$(CH$_2$)$_k$O(O)C—
—CH$_2$CH(OR$^{2'}$)CH$_2$O(O)C—
—(CH$_2$)$_k$SC(O)—
—(CH$_2$)$_k$S(CH$_2$)$_k$O(O)C—
—(CH$_2$)$_k$S(CH$_2$)$_k$OC(O)—
—(CH$_2$)$_k$SO$_2$—
—SO$_2$NR$^{1'}$(CH$_2$)$_k$—
—(CH$_2$)$_k$SO$_2$NR$^{1'}$(CH$_2$)$_k$C(O)O—
—CONR$^{1'}$(CH$_2$)$_k$C(O)O—
—CH$_2$CH(OR$^{2'}$)CH$_2$C(O)O—
—(CH$_2$)$_k$O—
—(CH$_2$)$_k$NR$^{1'}$—
—C$_k$H$_{2k}$—NR$^{1'}$C(O)NH—, and It will be understood that mixtures of oligomers corresponding to the general formula may be represented, in addition to single compounds, and that o, m, and n may be represented by non-integral values.

Polyols, suitable for use in preparing the fluorochemical compositions of the present invention comprising a mixture of polyol molecules, include those organic polyols that have an average hydroxyl functionality of greater than 1 (preferably about 2 to about 3; most preferably, about 2, as diols are most preferred). The hydroxyl groups can be primary or secondary, with primary hydroxyl groups being preferred for their greater reactivity.

Suitable polyols include those that comprise at least one aliphatic, heteroaliphatic, alicyclic, heteroalicyclic, aromatic, heteroaromatic, or polymeric moiety. Preferred polyols are aliphatic or polymeric polyols that contain hydroxyl groups as terminal groups.

The polyols may comprise at least one fluorine-containing group selected from the group consisting of perfluoroalkyl, perfluoroheteroalkyl, and perfluoroalkylene moieties. All of the perfluorocarbon chains, comprising these perfluoro moieties, are preferably six or fewer carbon atoms. Perfluoroalkyl moieties are preferred, with perfluoroalkyl moieties having 6 or fewer carbon atoms being preferred. Perfluoroheteroalkyl moieties may have 3 to 50 carbon atoms. Perfluoroheteroalkylene groups may have from 3 to 50 carbon atoms. Perfluoroheteroalkyl and alkylene moieties are preferably perfluoropolyethers with no perfluorocarbon chain of more than 6 carbon atoms.

Mixtures of fluorinated and non-fluorinated polyols may be advantageously utilized in preparing certain of the fluorochemical compositions of the instant invention. For example, inclusion of a non-fluorinated polyol can alter the melt temperature of the fluorochemical composition, making it more effective at the processing temperatures normally used in a given application. Increased cost effectiveness is also achieved by replacing a portion of the more expensive fluorinated polyol(s) with the less expensive non-fluorinated polyol(s). The selection of the non-fluorinated polyol(s) and the amount to use is determined by the performance requirements, for example melt temperature and repellency. When non-fluorinated polyol is used, a typically useful range of ratios of non-fluorinated polyol(s) to fluorinated polyols is about 1:1 to about 1:100.

Thus, the fluorochemical ester oligomer may comprise the condensation reaction products of one or more fluorinated polyols, optionally one or more non-fluorinated polyols, one or more polyacyl compounds and one or more monofunctional fluorine-containing compounds and optionally a non-fluorine containing monofunctional compound capable of reacting with a polyacyl compound or a polyol.

Representative examples of suitable fluorinated polyols comprised of at least one fluorine-containing group include $R^fSO_2N(CH_2CH_2OH)_2$ such as N-bis(2-hydroxyethyl)perfluorobutylsulfonamide; $R^fOC_6H_4SO_2N(CH_2CH_2OH)_2$; $R^fSO_2N(R')CH_2CH(OH)CH_2OH$ such as $C_6H_3SO_2N(C_3H_7)$ $CH_2CH(OH)CH_2OH$; $R^fCH_2CON(CH_2CH_2OH)_2$; $R^fCON(CH_2CH_2OH)_2$; $CF_3CF_2(OCF_2CF_2)_3OCF_2CON(CH_3)CH_2CH(OH)CH_2OH$; $R^fOCH_2CH(OH)CH_2OH$ such as $C_4F_9OCH_2CH(OH)CH_2OH$; $R^fCH_2CH_2SC_3H_6OCH_2CH(OH)CH_2OH$; $R^fCH_2CH_2SC_3H_6CH(CH_2OH)_2$; $R^fCH_2CH_2SCH_2CH(OH)CH_2OH$; $R^fCH_2CH_2SCH(CH_2OH)CH_2CH_2OH$; $R^fCH_2CH_2CH_2SCH_2CH(OH)CH_2OH$ such as $C_5F_{11}(CH_2)_3SCH_2CH(OH)CH_2OH$; $R^fCH_2CH_2CH_2OCH_2CH(OH)CH_2OH$ such as $C_5F_{11}(CH_2)_3OCH_2CH(OH)CH_2OH$; $R^fCH_2CH_2CH_2OC_2H_4OCH_2CH(OH)CH_2OH$; $R^fCH_2CH_2(CH_3)OCH_2CH(OH)CH_2OH$; $R^f(CH_2)_4SC_3H_6CH(CH_2OH)CH_2OH$; $R^f(CH_2)_4SCH_2CH(CH_2OH)_2$; $R^f(CH_2)_4SC_3H_6OCH_2CH(OH)CH_2OH$; $R^fCH_2CH(C_4H_9)SCH_2CH(OH)CH_2OH$; $R^fCH_2OCH_2CH(OH)CH_2OH$; $R^fCH_2CH(OH)CH_2SCH_2CH_2OH$; $R^fCH_2CH(OH)CH_2SCH_2CH_2OH$; $R^fCH_2CH(OH)CH_2OCH_2CH_2OH$; $R^fCH_2CH(OH)CH_2OH$; $R^fR''SCH(R'''OH)CH(R'''OH)SR''R^f$; $(R^fCH_2CH_2SCH_2CH_2SCH_2)_2C(CH_2OH)_2$; $((CF_3)_2CFO(CF_2)_2(CH_2)_2SCH_2)_2C(CH_2OH)_2$; $(R^fR''SCH_2)_2C(CH_2OH)_2$; 1,4-bis(1-hydroxy-1,1-dihydroperfluoroethoxyethoxy)perfluoro-n-butane $(HOCH_2CF_2OC_2F_4O(CF_2)_4OC_2F_4OCF_2CH_2OH)$; 1,4-bis(1-hydroxy-1,1-dihydroperfluoropropoxy)perfluoro-n-butane $(HOCH_2CF_2CF_2O(CF_2)_4OCF_2CF_2CH_2OH)$; fluorinated oxetane polyols made by the ring-opening polymerization of fluorinated oxetane such as POLY-3-FOX™ (from Omnova Solutions, Inc., Akron, Ohio); polyetheralcohols prepared by ring opening addition polymerization of a fluorinated organic group substituted epoxide with a compound containing at least two hydroxyl groups as described in U.S. Pat. No. 4,508,916 (Newell et al.); and perfluoropolyether diols such as FOMBLIN™ ZDOL $(HOCH_2CF_2O(CF_2O)_{8-12}(CF_2CF_2O)_{8-12}CF_2CH_2OH$ from Ausimont); wherein $R^f$ is a perfluoroalkyl group having 1 to 6 carbon atoms, or a perfluoroheteroalkyl group having 3 to about 50 carbon atoms with all perfluorocarbon chains present having 6 or fewer carbon atoms, or mixtures thereof;

R' is alkyl of 1 to 4 carbon atoms; R" is branched or straight chain alkylene of 1 to 12 carbon atoms, alkylenethio-alkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms; and R''' is a straight or branched chain alkylene of 1 to 12 carbon atoms or an alkylene-polyoxyalkylene of formula $C_rC_{2r}(OC_sH_{2s})_t$ where r is 1 to 12, s is 2 to 6, and t is 1 to 40. Preferred polyols comprised of at least one fluorine-containing group include N-bis(2-hydroxyethyl)perfluorobutylsulfonamide; fluorinated oxetane polyols made by the ring-opening polymerization of fluorinated oxetane such as POLY-3-FOX™ (from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al.); perfluoropolyether diols such as FOMBLIN™ ZDOL $(HOCH_2CF_2O(CF_2O)_{8-12}(CF_2CF_2O)_{8-12}CF_2CH_2OH$ from Ausimont); 1,4-bis(1-hydroxy-1,1-dihydroperfluoroethoxyethoxy)perfluoro-n-butane $(HOCH_2CF_2OC_2F_4O(CF_2)_4OC_2F_4OCF_2CH_2OH)$; and 1,4-bis(1-hydroxy-1,1-dihydroperfluoropropoxy)perfluoro-n-butane $(HOCH_2CF_2CF_2O(CF_2)_4OCF_2CF_2CH_2OH)$.

More preferred polyols comprised of at least one fluorine-containing group include N-bis(2-hydroxyethyl)perfluorobutylsulfonamide; 1,4-bis(1-hydroxy-1,1-dihydroperfluoropropoxy)perfluoro-n-butane $(HOCH_2CF_2CF_2O(CF_2)_4OCF_2CF_2CH_2OH)$.

Representative examples of suitable non-polymeric, non-fluorinated polyols include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl-1,3-pentanediol; 2,2,4-trimethyl-1,3-pentanediol; 3-methyl-1,5-pentanediol; 1,2-, 1,5-, and 1,6-hexanediol; 2-ethyl-1,6-hexanediol; bis(hydroxymethyl)cyclohexane; 1,8-octanediol; bicyclo-octanediol; 1,10-decanediol; tricyclo-decanediol; norbornanediol; and 1,18-dihydroxyoctadecane. The polyhydroxyalkanes include, for example, glycerine; trimethylolethane; trimethylolpropane;

2-ethyl-2-(hydroxymethyl)-1,3-propanediol; 1,2,6-hexanetriol; pentaerythritol; quinitol; mannitol; and sorbitol. The other polyhydroxy compounds include, for example, polyols such as di(ethylene glycol); tri(ethylene glycol); tetra(ethylene glycol); tetramethylene glycol; dipropylene glycol; diisopropylene glycol; tripropylene glycol; bis(hydroxymethyl)propionic acid; N,N-bis(2-hydroxyethyl)-3-aminopropyltriethoxysilane; bicine; 1,11-(3,6-dioxaundecane)diol; 1,14-(3,6,9,12-tetraoxatetradecane)diol; 1,8-(3,6-dioxa-2,5, 8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl)diphenylsulfone; 1,4-benzenedimethanol; 1,3-bis(2-hydroxyethyoxy)benzene; 1,2-dihydroxybenzene; resorcinol; 1,4-dihydroxybenzene; 3,5-, 2,6-, 2,5-, and 2,4-dihydroxybenzoic acid; 1,6-, 2,6-, 2,5-, and 2,7-dihydroxynaphthalene; 2,2'- and 4,4'-biphenol; 1,8-dihydroxybiphenyl; 2,4-dihydroxy-6-methyl-pyrimidine; 4,6-dihydroxypyrimidine; 3,6-dihydroxypyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; as well as other aliphatic, heteroaliphatic, saturated alicyclic, aromatic, saturated heteroalicyclic, and heteroaromatic polyols; and the like, and mixtures thereof.

Representative examples of useful polymeric non-fluorinated polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxyl-terminated polybutadienes); and the like. Mixtures of polymeric polyols can be used if desired.

Useful commercially available polymeric non-fluorinated polyols include CARBOWAX™ poly(ethylene glycol) materials in the number average molecular weight (Ma) range of from about 200 to about 2000 (from Union Carbide Corp.); poly(propylene glycol) materials such as PPG-425 (from Lyondell Chemicals); block copolymers of poly(ethylene glycol) and poly(propylene glycol) such as PLURONIC™ L31 (from BASF Corporation); Bisphenol A ethoxylate, Bisphenol A propyloxylate, and Bisphenol A propoxylate/ethoxylate (from Sigma-Aldrich); polytetramethylene ether glycols such as POLYMEG™ 650 and 1000 (from Quaker Oats Company) and the TERATHANE™ polyols (from DuPont); hydroxyl-terminated polybutadiene resins such as the Poly Bd™ materials (from Elf Atochem); the "PeP" series (from Wyandotte Chemicals Corporation) of polyoxyalkylene tetrols having secondary hydroxyl groups, for example, "PeP" 450, 550, and 650; polycaprolactone polyols with $M_n$ in the range of about 200 to about 2000 such as TONE™ 0201, 0210, 0301, and 0310 (from Union Carbide); PARAPLEX™ U-148 (from Rohm and Haas), an aliphatic polyester diol; polyester polyols such as the MULTRON™ poly(ethyleneadipate)polyols (from Mobay Chemical Co.); polycarbonate diols such as DURACARB™ 120, a hexanediol carbonate with $M_n$=900 (from PPG Industries Inc.); and the like; and mixtures thereof.

Preferred non-fluorinated polyols include 1,2-ethanediol; 1,2- and 1,3-propanediol; 1,3- and 1,4-butanediol; neopentylglycol; 1,5-pentanediol; 3-methyl-1,5-pentanediol; 1,2-, 1,5-, and 1,6-hexanediol; bis(hydroxymethyl)cyclohexane; 1,8-octanediol; 1,10-decanediol; di(ethylene glycol); tri(ethylene glycol); tetra(ethylene glycol); di(propylene glycol); di(isopropylene glycol); tri(propylene glycol); poly(ethylene glycol) diols (number average molecular weight of about 200 to about 1500); poly(di(ethylene glycol) phthalate) diol (having number average molecular weights of, for example, about 350 or about 575); poly(propylene glycols) diols (number average molecular weight of about 200 to about 500); block copolymers of poly(ethylene glycol) and poly(propylene glycol) such as PLURONIC™ L31 (from BASF Corporation); polycaprolactone diols (number average molecular weight of about 200 to about 600); resorcinol; hydroquinone; 1,6-, 2,5-, 2,6-, and 2,7-dihydroxynaphthalene; 4,4'-biphenol; bisphenol A; bis(4-hydroxyphenyl) methane; and the like; and mixtures thereof.

More preferred non-fluorinated polyols include 1,2-ethanediol; 1,2- and 1,3-propanediol; 1,4-butanediol; neopentylglycol; 1,2- and 1,6-hexanediol; di(ethylene glycol); tri (ethylene glycol); poly(di(ethylene glycol) phthalate) diol (having number average molecular weights of, for example, about 350 or about 575); poly(ethylene glycol) diols (having number average molecular weights of, for example, about 200, 300, 400); polypropylene glycol (having a number average molecular weight of, for example, about 425); dimer diol; polycaprolactone diol (having a number average molecular weight of, for example, about 530); 3,5-dihydroxybenzene; bisphenol A; resorcinol; hydroquinone; and mixtures thereof.

Polyacyl compounds and derivatives thereof (for example, dicarboxylic acid halides, dicarboxylic acid anhydrides, and dicarboxylic acid esters) suitable for use in preparing the fluorochemical composition comprise at least one aliphatic, heteroaliphatic (that is, containing in-chain heteroatoms, such as nitrogen, oxygen, or sulfur), saturated alicyclic, saturated heteroalicyclic, or polymeric moiety. Preferably, the polyacyl compounds are aliphatic in nature.

Acyl derivatives are sometimes preferred over acids for a variety of reasons. For example, acyl halides provide both relatively fast reaction rates and reactions that tend to go to completion. The resulting HCl is volatile and can be removed under vacuum or by other removal means, such as by water washing.

When a polyacid is used, a catalyst such as p-toluenesulfonic acid or trifluoromethanesulfonic acid can be used and can be selected so as to be removable or deactivatable (e.g., reacted with a base such as triethylamine, CaO, etc.) after reaction is complete so as to cause minimal decomposition of the resulting fluorochemical composition under use conditions.

Representative examples of suitable dicarboxylic acids and dicarboxylic acid derivatives include the following acids and their corresponding esters, halides, and anhydrides: adipic acid, (i.e., $R^1$ is 4), dodecanedioic acid (i.e., $R^1$ is 10), tetradecanedioic acid (i.e., $R^1$ is 12), octadecanedioic acid (i.e., $R^1$ is 16), eicosanedioic acid (i.e., $R^1$ is 18), and docosanedioic acid (i.e., $R^1$ is 20), most preferably $R^1$ is 12-16 carbon atoms.

When fluorochemical compositions of the present invention are used as topical treatments, aliphatic dicarboxylic acids (and derivatives thereof) are preferred.

Fluorochemical monofunctional compounds, useful in preparing the fluorochemical compositions of the present invention comprising a mixture of ester molecules, include those that comprise at least one $R^f$ group. The $R^f$ groups can contain straight chain, branched chain, or cyclic fluorinated alkylene groups or any combination thereof. The $R^f$ groups can optionally contain one or more heteroatoms (i.e., oxygen, sulfur, and/or nitrogen) in the carbon-carbon chain so as to form a carbon-heteroatom-carbon chain (i.e., a het- $R^fQ'$ may comprise fluorine-containing monoalcohols including the following:

| | |
|---|---|
| $R^fSO_2N(CH_3)CH_2CH_2OH$ | $CF_3(CF_2)_3SO_2N(CH_3)CH_2CH_2OH$ |
| $CF_3(CF_2)_3SO_2N(CH_3)CH(CH_3)CH_2OH$ | $CF_3(CF_2)_3SO_2N(CH_3)CH_2CH(CH_3)OH$ |
| | $R^fSO_2N(H)(CH_2)_2OH$ |
| $R^fSO_2N(CH_3)(CH_2)_4OH$ | $C_4F_9SO_2N(CH_3)(CH_2)_4OH$ |
| $C_6F_{13}SO_2N(CH_3)(CH_2)_4OH$ | $R^fSO_2N(CH_3)(CH_2)_{11}OH$ |
| $R_fSO_2N(C_2H_5)CH_2CH_2OH$ | $CF_3(CF_2)_3SO_2N(C_2H_5)CH_2CH_2OH$ |
| $C_6F_{13}SO_2N(C_2H_5)CH_2CH_2OH$ | $R^fSO_2N(C_2H_5)(CH_2)_6OH$ |
| $R^fSO_2N(C_2H_5)(CH_2)_{11}OH$ | $R^fSO_2N(C_3H_7)CH_2OCH_2CH_2CH_2OH$ |
| $R^fSO_2N(CH_2CH_2CH_3)CH_2CH_2OH$ | $R^fSO_2N(C_4H_9)(CH_2)_4OH$ |
| $R^fSO_2N(C_4H_9)CH_2CH_2OH$ | $C_3F_7CONHCH_2CH_2OH$ |
| 2-(N-methyl-2-(4-perfluoro-(2,6-diethylmorpholinyl))perfluoroethylsulfonamido)ethanol, | |
| $R^fCON(CH_3)CH_2CH_2OH$ | $R^fCON(C_2H_5)CH_2CH_2OH$ |
| $R^fCON(CH_3)(CH_2)_{11}OH$ | $R_fCON(H)CH_2CH_2OH$ |
| $C_2F_5O(C_2F_4O)_3CF_2CONHC_2H_4OH$ | $CF_3O(CF(CF_3)CF_2O)_{1-36}CF(CF_3)CH_2OH$ |
| $C_2F_5O(CF(CF_3)CF_2O)_{1-36}CF(CF_3)CH_2OH$ | $C_3F_7O(CF(CF_3)CF_2O)_{1-36}CF(CF_3)CH_2OH$ |
| $C_4F_9O(CF(CF_3)CF_2O)_{1-36}CF(CF_3)CH_2OH$ | $C_3F_7O(CF(CF_3)CF_2O)_{12}CF(CF_3)CH_2OH$ |
| $CF_3O(CF_2CF_2O)_{1-36}CF_2CH_2OH$ | $C_2F_5O(CF_2CF_2O)_{1-36}CF_2CH_2OH$ |
| $C_3F_7O(CF_2CF_2O)_{1-36}CF_2CH_2OH$ | $C_4F_9O(CF_2CF_2O)_{1-36}CF_2CH_2OH$ |
| $n\text{-}C_4F_9OC_2F_4OCF_2CH_2OCH_2CH_2OH$ | $CF_3O(CF_2CF_2O)_{11}CF_2CH_2OH$ |
| $R^fSO_2CH_2CH_2OH$, | $R^fC(O)OCH_2CH_2CH(CH_3)OH$ |
| $R^fC(O)OCH_2CH_2OH$, | $C_5F_{11}C(O)OCH_2CH_2OH$, |
| $R^f(CH_2)_{11}N(C_2H_5)CH_2CH_2OH$, | $R^fCH_2OH$, |
| $C_3F_7CH_2OH$, | Perfluoro(cyclohexyl)methanol |
| $C_4F_9CH_2CH_2OH$, | $CF_3(CF_2)_5CH_2CH_2OH$ |
| $R^fCH_2CH_2SO_2N(CH_3)CH_2CH_2OH$, | $CF_3(CF_2)_5CH_2CH_2SO_2N(CH_3)CH_2CH_2OH$, |
| $CF_3(CF_2)_3CH_2CH_2SO_2N(CH_3)CH_2CH_2OH$, | $R^fCH_2CH_2OH$, |
| $R^f(CH_2)_2OH$, | $R^f(CH_2)_2S(CH_2)_2OH$, |
| $C_4F_9(CH_2)_2S(CH_2)_2OH$, | $R^f(CH_2)_4S(CH_2)_2OH$, |
| $R^f(CH_2)_2S(CH_2)_3OH$, | $R^f(CH_2)_2SCH(CH_3)CH_2OH$, |
| $R^f(CH_2)_4SCH(CH_3)CH_2OH$, | $R^fCH_2CH(CH_3)S(CH_2)_2OH$, |
| $R^f(CH_2)_2S(CH_2)_{11}OH$, | $R^f(CH_2)_2S(CH_2)_3O(CH_2)_2OH$, |
| $R^f(CH_2)_3O(CH_2)_2OH$, | $R^f(CH_2)_3SCH(CH_3)CH_2OH$, and |
| $R^fSO_2N(H)(C_2H_4)OC(O)(CH_2)_5OH$ | | eroalkylene group). Fully-fluorinated groups are generally preferred, but hydrogen or chlorine atoms can also be present as substituents, provided that no more than one atom of either is present for every two carbon atoms. It is additionally preferred that any $R^f$ group contain at least about 40% fluorine by weight, more preferably at least about 50% fluorine by weight. The terminal portion of the group is generally fully-fluorinated, preferably containing at least three fluorine atoms, e.g., $CF_3O$—, $CF_3CF_2$—, $CF_3CF_2CF_2$—, $(CF_3)_2N$—, $(CF_3)_2CF$—, $SF_5CF_2$—. Perfluorinated aliphatic groups (i.e., those of the formula $C_nF_{2n+1}$—) wherein n is 1 to 6 inclusive are preferred. Further, it is preferred that the fluorochemical monofunctional compounds have a melting point above room temperature. It has been found that the oligomers derived from room temperature solid or crystallizable fluorochemical monofunctional compounds exhibit higher contact angle performance than lower melting compounds.

Useful fluorine-containing monofunctional compounds also include compounds of the following formula II:

$$R^fQ' \qquad (II)$$

wherein:

$R^f$ is a perfluoroalkyl group having 1 to 12 carbon atoms, or a perfluoroheteroalkyl group having 3 to about 50 carbon atoms with all perfluorocarbon chains present having 6 or fewer carbon atoms;

Q' is a moiety comprising a functional group that is reactive toward the terminal acyl (of the polyacyl compound) or hydroxyl groups (of the polyol).

It will be understood with reference to Formula I that the compound $R^fQ'$ reacts with the polyol or acyl compounds to provide the terminal moiety $R^fQ$—.

and the like, and mixtures thereof, wherein $R^f$ is a perfluoroalkyl group having 1 to 12 carbon atoms, or a perfluoroheteroalkyl group having 3 to about 50 carbon atoms with all perfluorocarbon chains present having 6 or fewer carbon atoms. If desired, rather than using such alcohols, similar thiols can be utilized.

Preferred fluorine-containing monoalcohols include 2-(N-methylperfluorobutanesulfonamido)ethanol; 2-(N-ethylperfluorobutanesulfonamido) ethanol; 2-(N-methylperfluorobutanesulfonamido)propanol; N-methyl-N-(4-hydroxybutyl)perfluorohexanesulfonamide; 1,1,2,2-tetrahydroperfluorooctanol; 1,1-dihydroperfluorooctanol; $C_6F_{13}CF(CF_3)CO_2C_2H_4CH(CH_3)OH$; n-$C_6H_3CF(CF_3)$CON(H)$CH_2CH_2OH$; $C_4F_9OC_2F_4OCF_2CH_2OCH_2CH_2OH$; $C_3F_7CON(H)CH_2CH_2OH$; 1,1,2,2,3,3-hexahydroperfluorodecanol; $C_3F_7O(CF(CF_3)CF_2O)_{1-36}CF(CF_3)CH_2OH$; $CF_3O(CF_2CF_2O)_{1-36}CF_2CH_2OH$; $C_4F_9$—$SO_2NMeC_2H_4OH$; and the like; and mixtures thereof.

Other useful fluorine-containing compounds include functional oligomeric fluoroacrylates such as those described as component (a) in paragraph[00010] of U.S. Patent Application No. 2007/0004895 (incorporated herein by reference in its entirety) and fluorinated polyethers such as those described in formulas (I) and (III) of U.S. Pat. No. 7,214,736 (incorporated herein by reference in its entirety) where $T_k$ is a reactive group capable of reacting with an acyl group or hydroxyl group.

The fluorochemical monofunctional compound, $R^fQ'$, may comprise derivatives (such as esters or acid halides) of fluorine-containing monocarboxylic acids including (1) those having the formula $R^f(CH_2)_n(X)_p(CH_2)_mC(O)OH$, wherein $R^f$ is as defined above, n and m are independently integers of 0 to 14 (preferably 0 to 8, more preferably 0 to 4), X is divalent oxygen or sulfur, and p is an integer of 0 or 1, and (2) those having the formula R$^f$OR'C(O)OH, wherein R$^f$ is as defined above, R' is a divalent alkyl (straight chain or branched) or cycloalkyl radical having from 1 to about 12 carbon atoms (preferably from 1 to about 8 carbon atoms, more preferably from 1 to about 4 carbon atoms).

In certain embodiments, the divalent linking group Q is —SO$_2$N(R")— or —CON(R")— wherein R" is a monovalent alkyl (straight chain or branched), cycloalkyl, or aryl radical having from 1 to about 12 carbon atoms (preferably from 1 to about 8 carbon atoms, more preferably from 1 to about 4 carbon atoms).

Representative examples of useful derivatives of fluorine-containing monocarboxylic acids include perfluorobutanoic (C$_3$F$_7$C(O)OH), perfluoroisobutanoic ((CF$_3$)$_2$CFC(O)OH), hydroperfluorobutanoic (C$_3$F$_6$HC(O)OH), perfluoropentanoic (C$_4$F$_9$C(O)OH), hydroperfluoropentanoic (C$_4$F$_8$HC(O)OH), perfluorohexanoic (C$_5$F$_{11}$C(O)OH), hydroperfluorohexanoic (C$_5$F$_{10}$HC(O)OH), perfluorcyclohexanyl carboxylic (C$_6$F$_{11}$C(O)OH), perfluoroheptanoic (C$_6$F$_{13}$C(O)OH), perfluoro(3-ethoxypropionic), perfluoro(3-propoxypropionic), perfluoro(3-butoxypropionic), perfluoro(3-pentoxypropionic), R$^f$[OCF(CF$_3$)CF$_2$]$_{1-6}$OCF(CF$_3$)C(O)OH where R$^f$ is a perfluroalkyl group of 1 to 12 carbon atoms, 4-(4-perfluoroisopropoxyperfluorobutyl) butanoic, 4-(bis (perfluoroisopropyl)fluoromethoxy)perfluorobutanoic, 12-(2-perfluoroisopropoxyperfluoroethyl) dodecanoic, 6-(2-perfluorocyclobutoxyperfluoroethyl) hexanoic, 4-(bis(perfluoroisopropyl)fluoromethoxy)perfluorobutanoic, 4-(2-bis(perfluoroisopropyl)fluoromethoxyperfluoroethyl) butanoic, 2-(N-(ethyl)perfluorobutanesulfonamido)acetic, and 2-(N-(methyl)perfluorobutanesulfonamido)acetic, and the like, and mixtures thereof.

Preferred fluorine-containing monocarboxylic acids include 2-(N-(ethyl)perfluorobutanesulfonamido)acetic, 2-(N-(methyl)perfluorobutanesulfonamido) acetic, and the like, and mixtures thereof.

It will be understood, with respect to the above lists, that the terminal hydroxyl or carboxyl groups may be replaced with other functional groups Q' that are reactive with terminal acyl group (of the polyacyl compounds) or hydroxyl groups (of the polyol) to form the linking group Q of Formula I.

If desired, non-fluorinated monofunctional compounds, such as monoalcohol(s) or monocarboxylic acid(s) can be utilized in addition to the fluorine-containing monoalcohol(s) or monocarboxylic acid(s) as a portion of the total monoalcohol or monocarboxylic acid charge (for example, in amounts up to about 50 mole percent of the total).

In some embodiments, oligomers are of the formula (IIIa):

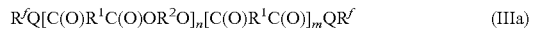   (IIIa)

wherein:
n is a number from 1 to 10 inclusive;
m is 1;
R$^f$ is a perfluoroalkyl group having 1 to 12 carbon atoms, or a perfluoroheteroalkyl group having 3 to 50 carbon atoms with all perfluorocarbon chains present having 1 to 6;
Q is a divalent linking group;
R$^1$ is a straight chain alkylene of 2 to 22 carbon atoms;
R$^2$ is a polyvalent organic group which is a residue of the polyol, that is a straight or branched chain alkylene, cycloalkylene, arylene or heteroalkylene group of 1 to 14 carbon atoms, or an arylene group of 6 to 12 carbon atoms wherein at least a portion of R$^2$ groups comprise one perfluoroalkyl group, perfluoroheteroalkyl group, perfluoroheteroalkylene group, or mixtures thereof.

The most preferred ester oligomers comprises the condensation reaction product of one or more fluorinated polyols, an excess amount (relative to the polyol) of one or more diacyl compounds, and sufficient fluorinated monoalcohols to react with the terminal acyl groups. Such most preferred oligomers correspond to the Formula (IIIb)

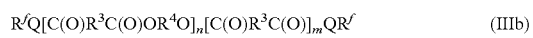   (IIIb)

wherein:
n is a number from 1 to 10 inclusive;
m is 1;
R$^f$ is a perfluoroalkyl group having 1 to 12, preferably 6 or fewer carbon atoms, or a perfluoroheteroalkyl group having 3 to about 50 carbon atoms with all perfluorocarbon chains present having 1 to 6, preferably 1 to 4 carbon atoms;
Q is a divalent linking group as previously described;
R$^3$ which may be the same or different is a straight chain alkylene of 15 to 20 carbon atoms;
R$^4$ is a polyvalent organic group which is a residue of the polyol, that is a straight or branched chain alkylene, cycloalkylene, arylene or heteroalkylene group of 1 to 14 carbon atoms, preferably 1 to 8 carbon atoms, more preferably 1 to 4 carbon atoms, and most preferably two carbon atoms, or an arylene group of 6 to 12 carbon atoms; at least a portion of R$^4$ groups are substituted with or contain one perfluoroalkyl group, perfluoroheteroalkyl group, perfluoroheteroalkylene group, or mixtures thereof.

The fluorochemical compositions may further comprise the reaction product of polymerizable compounds comprising one or more polymerizable groups and at least one reactive group, reactive with hydroxyl or acyl groups. The polymerizable group may be incorporated into the fluorochemical ester oligomers by means of a reactive functional group, as previously described. Examples of useful polymerizable groups include but are not limited to acrylate, methacrylate, vinyl, allyl, and glycidyl. Representative useful compounds having polymerizable groups include hydroxyethyl acrylate, hydroxyethyl methacrylate, pentaerythriol triacrylate, allyl alcohol, glycidol, C$_2$H$_5$(CH$_3$)C=NOH, CH$_2$=CHO(CH$_2$)$_4$OH and glycidyl methacrylate.

The fluorochemical compositions of the present invention comprising a mixture of ester molecules can be made by simple blending of the polyol(s), monofunctional compound(s), polyacyl compound(s) and optionally (d) one or more polymerizable compounds. As one skilled in the art would understand, the order of blending or the ordering of the steps is non-limiting and can be modified so as to produce a desired fluorochemical composition. In the synthesis, for example, the polyacyl compound(s), the polyol(s), the fluorine-containing monofunctional compound (R$_f$Q'), and optionally (d) one or more polymerizable compounds and a solvent are charged to a dry reaction vessel in immediate succession or as pre-made mixtures. When a homogeneous mixture or solution is obtained a catalyst is typically added, and the reaction mixture is heated. The temperature is generally determined by the boiling point of the solvent, and the boiling point of the byproducts. Byproducts, such as water or alcohols are generally removed by azeotropic distillation.

When a fluorine-containing monofunctional compound (R$^f$Q') is used to prepare fluorine-containing ester oligomers of Formula I above, the molar ratio of monofunctional compound and/or polyol to polyacyl compound can be varied to control the molecular weight and to tailor the properties of the resultant polyester as desired.

Depending on reaction conditions (e.g., reaction temperature and/or polyacyl compound used), a catalyst level of up to about 0.5 percent by weight of the polyacyl compound/polyol/monofunctional compound mixture may be used, but typically about 0.00005 to about 0.5 percent by weight is required, about 0.02 to about 0.1 percent by weight being preferred. Suitable catalysts include those acid and base esterification catalysts such as are known in the art. Useful catalysts include para-toluene sulfonic acid and $CF_3SO_3H$. If an acid catalyst is used, it is preferably removed from the oligomer or neutralized after the oligomerization. It has been found that the presence of the catalyst may deleteriously affect the contact angle performance.

A mixture of polyols and/or a mixture of monofunctional compounds can be used instead of a single polyol and/or a single monofunctional compound. For example, a polyol mixture comprising a polyol with a polymerizable group and a polyol with an $R^f$ group can be used. As well, a monofunctional compound mixture comprising a monofunctional compound with a polymerizable group and a fluorine-containing monofunctional compound can be used.

The fluorochemical compositions of the invention can be prepared by using procedures and apparatus known to those skilled in the art of esterification and ester exchange reactions. For example, the fluorochemical compositions can be prepared by (a) simultaneously reacting the fluorine-containing monofunctional compound with the polyol and the diacyl compound (or derivative); (b) first reacting the polyol with the polyacyl compound (or derivative), and then reacting the resulting mixture with the fluorine-containing monofunctional compound; or (c) first reacting either the fluorine-containing monofunctional compound with the diacyl compound (or derivative) or the fluorine-containing monofunctional compound with the polyol, and then reacting the resulting mixture with the remaining reactant.

The reactions can be carried out in solution or in the molten state (using commonly-used solvents and/or equipment), generally under atmospheric pressure and at temperatures sufficient to maintain the reactants in solution or in the melt. For example, melt temperatures in the range of about 90 to about 240° C. (preferably, about 100 to about 210° C.; more preferably, about 110 to about 170° C.) can generally be utilized. Removal of solvent or byproduct HCl, if present, can be conducted at reduced pressures, for example, using a vacuum equivalent to about 500 torr (67 kPa) or less. Removal of esterification byproducts by distillation may be effected by selection of an appropriate solvent, such as toluene or fluorinated ethers such as NOVEC™ HFE-7100™ or HFE-7200™ (from 3M Company).

If water is a by-product, then water immiscible hydrocarbon solvents such as heptane or toluene, fluorinated ethers, or perfluorocarbons are preferred. If the byproducts are lower alcohols, then perfluorocarbons are preferred.

The fluorochemical compositions of the present invention comprising a mixture of ester oligomers can also be made following a step-wise synthesis in addition to a batch method. In the synthesis, the polyacyl compound and the polyol are dissolved together under dry conditions, preferably in a solvent, and then the resulting solution is heated as previously described, with mixing in the presence of a catalyst for one-half to two hours, preferably one hour.

The resulting ester oligomers may then be further reacted with one or more of the monofunctional compounds described above. The monofunctional compounds may be added to the above reaction mixture, and react(s) with the remaining or a substantial portion of the remaining hydroxyl or acyl groups. The above temperatures, dry conditions, and mixing are continued one-half to two hours, preferably one hour. Terminal fluorine-containing groups may thereby bonded to the hydroxyl or acyl functional ester oligomers and compounds. These oligomers and compounds can be optionally further functionalized with polymerizable groups described above by reacting any of the remaining hydroxyl or acyl groups in the resulting mixture with one or more of the reactive polymerizable group-containing compounds described above. Thus, the polymerizable compound(s) is (are) added to the reaction mixture, using the same conditions as with the previous additions.

Polymerizable group-containing compounds can be added and reacted with hydroxyl or acyl groups under the conditions described above in any of the steps described above. For example, as mentioned above, the polymerizable group-containing compound can be added as a mixture with the polyol. Alternatively, the polymerizable group-containing compound can be added (a) after reaction of the polyol with the polyacyl compound, (b) as a mixture with the monoalcohol(s), and (c) after reaction of the polyol and monofunctional compound with the polyacyl compound. When the polymerizable group-containing compound is a monoalcohol, it is preferably added as a mixture with the fluorine-containing monoalcohol. When the polymerizable group-containing compound is a diol, it is preferably added as a mixture with the polyol.

If desired for particular applications, small amounts of one or more polymeric or non-polymeric chain extenders (for example, diamines) can be utilized, in addition to the above-described reactants, in preparing the fluorochemical composition.

Carbodiimide—(B)

In addition to one or more of the aforementioned esters, compositions of the invention comprise one or more carbodiimide compounds.

Illustrative examples include carbodiimide compounds and mixtures of carbodiimide compounds derived from a carbodiimidization reaction of at least one oligomer having at least one isocyanate group and comprising at least two repeating units deriving from one or more ethylenically unsaturated monomers.

The carbodiimide compound can be an aromatic or aliphatic carbodiimide compound and may include a polycarbodiimide. Carbodiimides that can be used have been described in, for example, U.S. Pat. Nos. 4,668,726, 4,215,205, 4,024,178, 3,896,251, 5,132,028, 5,817,249, 4,977,219, 4,587,301, 4,487,964, 3,755,242 and 3,450,562 and PCT Application No. WO 93/22282, One or more polycarbodiimides can be selected from the group of PCD-1 to PCD-12 (mole ratios), prepared as described in U.S. Publication No. 2006/0094851:

PCD-1: 8 MDI/2 isostearylalcohol/(8 ODA/HDA-HSCH$_2$CHOHCH$_2$OH);

PCD-2: 4 MDI/isostearylalcohol/(8 iBMA-HSCH$_2$CH$_2$OH);

PCD-3: 4 MDI/0.5 isostearyl alcohol/0.5 stearylalcohol/(8 iBMA-HSCH$_2$CH$_2$OH);

PCD-4: 4 MDI/0.5 isostearyl alcohol/0.5 behenyl alcohol/(8 iBMA-HSCH$_2$CH$_2$OH);

PCD-5: 4 MDI/isostearyl alcohol/(4 ODA-HSCH2CH2OH);

PCD-6: 5 MDI/glycerol monostearate/2 (4 MMA-HSCH$_2$CH$_2$OH);

PCD-7: 12 MDI/(4 ODA/HDA-HSCH$_2$CH$_2$OH)/2 GMS;

PCD-8: 12 MDI/(4 ODA/HDA-MeFBSEA-HSCH$_2$CH$_2$OH)/2 GMS;
PCD-9: 12 MDI/(2 ODA/HDA-(2 ODI-HEMA)-HSCH$_2$CH$_2$OH)/2 GMS;
PCD-10: 12 MDI/((4 ODI-HEMA)-HSCH$_2$CH$_2$OH)/2 GMS;
PCD-11: 12 MDI/isostearylalcohol/(8 ODA/HDA-HSCH$_2$CH$_2$OH)/2 GMS; and
PCD-12: 12 MDI/isostearylalcohol/(8 ODA/HDA-HSCH$_2$CH$_2$OH)/4 GMS;
wherein:
PCD: polycarbodiimide
MDI=4,4'-MDI: 4,4' methylene diphenyl diisocyanate, available from BASF AG
iBMA: isobutyl methacrylate
ODA/HDA: a 50/50 blend of octadecylacrylate and hexadecane acrylate, available as PHOTOMER 4818F from Cognis,
ODA: octadecyl acrylate, available from Osaka
ODI: octadecyl isocyanate
GMS: glycerol monostearate
MMA: methyl methacrylate
MeFBSEA: methyl perfluorobutyl sulfonamido ethylacrylate
HEMA: hydroxy ethyl methacrylate.

In still a further aspect, the invention relates to a carbodiimide compound or mixture wherein one or more of the carbodiimide compounds can be represented by the formula (IV):

$$Q^1X^1CONH(A^1(N{=}C{=}N)_q)_mA^2NHCOX^2Q^2 \quad (IV)$$

wherein $X^1$ and $X^2$ each independently represents O, S, or NH; $A^1$ and $A^2$ each independently represents the residue of an organic di- or triisocyanate compound obtained by removing the isocyanate groups therefrom; q is 1 or 2; m has a value of 1 to 20; and $Q^1$ and $Q^2$ are selected from a hydrocarbon group that may contain one or more catenary or non-catenary hetero-atoms, a partially or fully fluorinated hydrocarbon group group that may contain one or more catenary or non-catenary hetero-atoms and functional groups corresponding to any of the following formulas:

$$G^3M^hL^2\text{-} \quad (i)$$

$$Q^3X^3OCNHA^4((N{=}C{=}N)tA^3)_sNHCOX^4L^3M^hG^4\text{-} \quad (ii)$$

$$Q^3X^3OCNHA^4((N{=}C{=}N)tA^3)_sNHCOX^4L^4\text{-} \quad (iii)$$

$$G^4M^hL^2X^3OCNHA^4((N{=}C{=}N)tA^3)_sNHCOX^4L^4\text{-} \quad (iv)$$

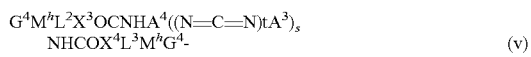

$$G^4M^hL^2X^3OCNHA^4((N{=}C{=}N)tA^3)_s\\NHCOX^4L^3M^hG^4\text{-} \quad (v)$$

wherein $G^3$ and $G^4$ each independently represents an end group; $M^h$ represents two or more repeating units deriving from one or more ethylenically unsaturated monomers; $L^2$ represents an organic divalent linking group; $Q^3$ represents a hydrocarbon group that may contain one or more catenary or non-catenary hetero-atoms or a partially or fully fluorinated hydrocarbon group that may contain one or more catenary or non-catenary hetero-atoms; $A^3$ and $A^4$ each independently represents the residue of an organic di- or triisocyanate compound obtained by removing the isocyanate groups therefrom; $X^3$ and $X^4$ each independently represents O, S, or NH; s has a value of 1 to 20; t is 1 or 2; $L^3$ represents an organic trivalent linking group; and $L^4$ represents a hydrocarbon group that may optionally contain one or more catenary or non-catenary hetero-atoms or a partially or fully fluorinated hydrocarbon group that may contain one or more catenary or non-catenary hetero-atoms; and wherein at least one $Q^1$ and $Q^2$ corresponds to a group of formula (i), (ii), (iv) or (v).

In still a further aspect, the invention relates to a composition comprising a fluorinated compound and a carbodiimide compound or mixture of carbodiimide compounds derived from a carbodiimidization reaction of at least one oligomer having at least one isocyanate group and comprising at least two repeating units deriving from one or more ethylenically unsaturated monomers.

In yet a further aspect, the invention pertains to a method of treatment of a substrate, in particular a fibrous substrate, with an aforementioned composition, to render the substrate water and/or oil repellent. In particular, the compositions have been found to be suitable for use in an application method where the substrate is guided through rolls.

It has been found that the carbodiimide compound or mixture of carbodiimide compounds of the present invention can act as excellent extenders in the treatment of substrates, thus typically allowing more efficient use of the more expensive fluorinated compounds. The compositions comprising the carbodiimide compound or mixture of carbodiimide compounds and a fluorinated compound generally provide effective static and/or dynamic water repellency onto substrates.

According to a particular embodiment, the carbodiimide compound or mixture of carbodiimide compounds of the present invention can be prepared in a three step reaction although it will generally not be required to separate reaction products after the individual steps, i.e., the reaction may be carried out in three steps in a single reactor. In a first step, a functionalized oligomer having at least two repeating units, is prepared which, in a second step, is reacted to form an oligomer having at least one isocyanate group. In a third step said oligomer is further reacted to form a carbodiimide. With the term 'functionalized oligomer' is meant that an oligomer is prepared that contains a functional group capable of reacting with an isocyanate.

In a first step, a functionalized oligomer having at least two repeating units can be prepared by free radical oligomerization of one or more ethylenically unsaturated monomers, typically non-fluorinated ethylenically unsaturated monomers. Examples of ethylenically unsaturated monomers include those represented by the general formula (V):

$$R^hC(R){=}CR_2 \quad (V)$$

wherein $R^h$ represents H, Cl, or a hydrocarbon group that may contain one or more catenary (i.e., in-chain, bonded only to carbon) or non-catenary hetero-atoms and wherein each R being the same or different represents H, a lower alkyl of 1 to 4 carbon atoms, Cl, or Br.

The term 'hydrocarbon group' in connection with the present invention, means any substantially fluorine-free organic moiety that contains hydrogen and carbon, and optionally, one or more substituents.

Suitable ethylenically unsaturated monomers are known and are generally commercially available. Examples of such compounds include the general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and esters such as vinyl, allyl, methyl, butyl, isobutyl, hexyl, heptyl, 2-ethyl-hexyl, cyclohexyl, lauryl, stearyl, isobornyl, octadecyl, hexadecyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha, beta-unsaturated carboxylic acid derivatives such as allyl alcohol, allyl glycolate, acrylamide, methacrylamide, n-diisopropyl acrylamide, diacetoacrylamide, N,N-diethylaminoethylmethacrylate, N-t-butylamino ethyl methacrylate; styrene and its derivatives such as vinyl toluene, alpha-methylstyrene, alpha-cyanomethyl styrene; lower olefinic hydrocarbons which contain halogen such as ethylene, propylene, isobutene, 3-chloro-1-isobutene, isoprene, and allyl or vinyl halides such as vinyl and vinylidene chloride. Other useful monomers include monomers that contain a urethane group, such as the reaction product of 2-hydroxy-ethyl(meth)acrylate with a monofunctional isocyanate, such as octadecyl isocyanate. Particular suitable monomers include those selected from the group consisting of octadecyl(meth)acrylate, hexadecyl(meth) acrylate, methylmethacrylate, butyl(meth)acrylate, isobutyl (meth)acrylate and isobornyl(meth)acrylate, ethylhexyl methacrylate, urethane containing (meth)acrylate as described above, and mixtures thereof.

The free radical oligomerization is typically carried out in the presence of mono- or difunctional hydroxy- or amino functionalized chain transfer agents, in order to prepare mono- or difunctionalized oligomers respectively. Examples of mono functional chain transfer agents include those selected from 2-mercaptoethanol, 3-mercapto-2-butanol, 3-mercapto-2-propanol, 3-mercapto-1-propanol and 2-mercapto-ethylamine. A particularly suitable monofunctional chain transfer agent is 2-mercaptoethanol.

Examples of difunctional chain transfer agents include those having two hydroxyl or amino groups or a hydroxy and amino group. A particular suitable example of a difunctional chain transfer agent is 3-mercapto-1,2-propanediol.

The functionalized oligomer should generally comprise a sufficient number of repeating units to render the portion oligomeric. The oligomer suitably comprises from 2 to 40, in particular from 2 to 20 repeating units derived from one or more ethylenically unsaturated monomers. According to a particular embodiment, the oligomer has 3 to 15 repeating units. According to another embodiment, the oligomer has between 4 and 15 repeating units.

In order to prepare the functionalized oligomer, a free-radical initiator may be used to initiate the oligomerization. Free-radical initiators include those known in the art and include in particular azo compounds, such as 2,2'-azobisisobutyronitrile (AIBN) and 2,2'-azobis(2-cyanopentane) and the like, hydroperoxides such as cumene, t-butyl, and t-amylhydroperoxide, peroxyesters such as t-butylperbenzoate and di-t-butylperoxyphtalate, diacylperoxides such as benzoyl peroxide and lauroyl peroxide.

The oligomerization reaction can be carried out in any solvent suitable for organic free-radical reactions. Particularly suitable solvents are solvents that do not interfere with the isocyanate reactions in the second and the third step to form the carbodiimide. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethyl acetate, butyl acetate), ketones (e.g., acetone, methylethyl ketone, methyl isobutyl ketone) and mixtures thereof.

The oligomerization reaction can be carried out at any temperature suitable for conducting a free-radical oligomerization reaction. Particular temperature and solvents for use can be easily selected by those skilled in the art based on considerations such as the solubility of reagents, the temperature required for the use of a particular initiator, molecular weight desired and the like. While it is not practical to enumerate a particular temperature suitable for all initiators and all solvents, generally suitable temperatures are between about 30° C. and about 150° C.

In a second step, an oligomer having at least one isocyanate group is prepared by a condensation reaction of the functionalized oligomer with an excess of a polyisocyanate, i.e., a di- or triisocyanate. Generally, the second reaction step is also conducted in the presence of one or more further isocyanate reactive compounds. Such further isocyanate reactive compounds are typically compounds containing one or two isocyanate-reactive groups and include mono- and difunctional alcohols, thiols and amines. The further isocyanate reactive compounds are generally non-fluorinated but can be partially or fully fluorinated as well. A single compound or a mixture of different compounds may be used. Examples include alcanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearylalcohol, behenyl alcohol, branched long chain alkanols, such as Guerbet alcohols (2-alkyl alkanols having C-14 to C-24 alkyl chains, available from Henkel), alcohols comprising poly(oyalkylene) groups, such as eg. methyl or ethyl ether of polyethyleneglycol, hydroxyl-terminated methyl or ethyl ether of random or block copolymer of ethyleneoxide and/or propyleneoxide and polysiloxane group containing alcohols. Further examples include diols, such as 1,4-butanediol, 1,6-hexanediol, 1-10-decanediol, 4,4'-isopropylidene diphenol (Bisphenol A); polyester diols, such as polycaprolactone diol, fatty acid dimer diols and poly(oxy)alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$—, and —OCH(CH$_3$)CH(CH$_3$)—(preferably the oxyalkylene units in said poly(oxyalkylene) being the same, as in polypropyleneglycol or present as a mixture), ester diols, such as glycerolmonostearate and polysiloxane group containing diols.

Further suitable isocyanate reactive compounds include amino group containing compounds, such as amino-terminated polyethyleneoxide or propyleneoxide or copolymers thereof, amino-terminated methyl or ethylethers of polyethyleneoxide or polypropyleneoxide or copolymers thereof and amino group terminated polysiloxanes. Fluorinated isocyanate reactive compounds that may be used include for example partially fluorinated or perfluorinated polyethers that have one or two isocyanate reactive groups such as hydroxyl groups, amino groups and thiol groups. Still further, a fluorinated isocyanate reactive compound that can be used is a partially or fully fluorinated aliphatic compound having one or two isocyanate reactive groups such as hydroxyl groups, amino groups and thiol groups. Examples of the latter include perfluorinated aliphatic mono-alcohols having 3, 4 or up to 14 carbon atoms. Still further suitable isocyanate reactive compounds include thiol group containing compounds, such as 1,4-butanedithiol, 1,6-hexanedithiol.

Particularly suitable further isocyanate reactive compounds include monofunctional alcohols, such as (iso)stearylalcohol and C-18 2-alkyl alkanols; ester diols, such as glycerol monostearate, amino- or hydroxy group containing polysiloxanes and mixtures thereof.

The isocyanate reactive compounds may be used alone or in combination. The isocyanate reactive compound can be present up to about 50 mole % based on the total amount of isocyanate functionalities.

Polyisocyanates for use in accordance with the present invention include aliphatic and aromatic di- and triisocyanates. Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethyl-cyclohexylisocyanate; 3-isocyanatomethyl-3,5,5-trimethyl-cyclohexylisocyanate; aliphatic diisocyanates such as 1,6-hexamethylenediisocyanate, 2,2,4-trimethyl-1,6-hexamethylenediisocyanate, and 1,2-ethylenediisocyanate; cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as polymethylenpolyphenylisocyanate (PAPI, Voranate™), DESMODURTMR (tri-(4-isocyanatophenyl)-methane, available from Bayer) and DESMODUR™ L (available from Bayer). Also useful are isocyanates containing internal isocyanate derived moieties such as biuret-containing triisocyanates such as that available from Bayer as DESMODUR™ N-100 and isocyanurate-containing triisocyanates such as that available from Huls AG, Germany, as IPDI-1890 and Desmodur N-3300, available from Bayer.

Particular suitable polyisocyanates include aromatic polyisocyanates such as MDI and 2,4-toluenediisocyanate and aliphatic polyisocyanates, such as hexamethylene diisocyanate, Desmodur™ N, Desmodur™ W and Desmodur™ N-3300.

The oligomer having at least one isocyanate group can be prepared by a condensation reaction, carried out under conventional conditions well-known to those skilled in the art. The condensation reaction is preferably carried out under dry conditions in a polar solvent such as ethyl acetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

In a particular embodiment of the present invention, the oligomer having at least one isocyanate group may be represented by formula (VI):

$$G^1M^hG^2 \quad (VI)$$

wherein $M^h$ represents two or more repeating units deriving from one or more ethylenically unsaturated monomers, $G^1$ and $G^2$ each independently represents an end group and wherein at least one of the end groups comprises an isocyanate group. In one embodiment of the invention, one of the end groups is free of isocyanate groups and the other group comprises one or two isocyanate groups. In a particular embodiment, one of the end groups is free of isocyanate groups and the other group comprises a group of the formula:

-L¹CONHZNCO wherein $L^1$ represents O, or NH, and Z represents an aliphatic or aromatic group.

In a third step, the carbodiimide compound or mixture of carbodiimide compounds can be formed by a condensation reaction of the oligomers having at least one isocyanate group, in the presence of suitable catalysts as described, for example, by K. Wagner et al., Angew. Chem. Int. Ed. Engl., vol. 20, p 819-830 (1981); by S. R. Sandler et al., Org. Functional Group Prep., vol. 2, p 205-222 (1971) and by A Williams et al., Chem. Rev., vol. 81, p 589-636 (1981). The preparation of urethane containing or urethane terminated polycarbodiimides has been described in, e.g., U.S. Pat. No. 2,941,983 and by T. W. Campbell et al. in J. Org. Chem., 28, 2069 (1963). Representative examples of suitable catalysts are described in, e.g., U.S. Pat. Nos. 2,941,988, 3,862,989, and 3,896,251. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the organic polyisocyanate being used. A concentration range of 0.05-5 parts of catalyst per 100 parts of oligomer having at least one isocyanate group is generally suitable. The carbodiimidization reaction may involve further isocyanate compounds other than the isocyanate containing oligomer. Such further isocyanate compounds include mono-isocyanates as well as polyisocyanates such as those described above.

In a particular embodiment according to the present invention the carbodiimide compound can be represented by the formula (IV):

$$Q^1X^1CONH(A^1(N=C=N)_q)_mA^2NHCOX^2Q^2 \quad (IV)$$

wherein $X^1$ and $X^2$ each independently represents O, S, or NH, $A^1$ and $A^2$ each independently represents the residue of an organic di- or triisocyanate compound obtained by removing the isocyanate groups therefrom, q is 1 or 2, m has a value of 1 to 20, and $Q^1$ and $Q^2$ are selected from a hydrocarbon group that may contain one or more catenary or non-catenary hetero-atoms, a partially or fully fluorinated hydrocarbon group that may contain one or more catenary or non-catenary hetero-atoms and functional groups corresponding to any of the following formulas:

$$G^3M^hL^2- \quad (i)$$

$$Q^3X^3OCNHA^4((N=C=N)_rA^3)_sNHCOX^4L^3M^hG^4- \quad (ii)$$

$$Q^3X^3OCNHA^4((N=C=N)_rA^3)_sNHCOX^4L^4- \quad (iii)$$

$$G^4M^hL^2X^3OCNHA^4((N=C=N)_rA^3)_sNHCOX^4L^4- \quad (iv)$$

$$G^4M^hL^2X^3OCNHA^4((N=C=N)_rA^3)_sNHCOX^4L^3M^hG^4- \quad (v)$$

wherein $G^3$ and $G^4$ each independently represents an end group, $M^h$ represents two or more repeating units deriving from one or more ethylenically unsaturated monomers, $L^2$ represents an organic divalent linking group, $Q^3$ represents a hydrocarbon group that may contain one or more catenary or non-catenary hetero-atoms or a partially or fully fluorinated hydrocarbon group that may contain one or more catenary or non-catenary hetero-atoms, $A^3$ and $A^4$ each independently represents the residue of an organic di- or triisocyanate compound obtained by removing the isocyanate groups therefrom, $X^3$ and $X^4$ each independently represents O, S, or NH, s has a value from 1 to 20 and t is 1 or 2, $L^3$ represents an organic trivalent linking group and $L^4$ represents hydrocarbon group that may optionally contain one or more catenary or non-catenary hetero-atoms or a partially or fully fluorinated hydrocarbon group that may contain one or more catenary or non-catenary hetero-atoms; and wherein at least one of $Q^1$ and $Q^2$ corresponds to a group of formula (i), (ii), (iv) or (v).

The groups $A^1$, $A^2$, $A^3$, and $A^4$ (hereinafter collectively referred to as "A-groups") each independently represent the residue of an organic di- or triisocyanate compound obtained by removing the isocyanate groups therefrom. The A-groups may be the same or different. When A is trivalent, derived from triisocyanates, branched or crosslinked polycarbodiimides can result. Different A-groups may be used together to give slight branching in order to modify properties. Substituents may be present in A provided they contain no isocyanate-reactive hydrogen atoms. Particularly suitable groups A are unsubstituted organic linking groups, such as, e.g., The endgroups $G^3$ and $G^4$ typically represent hydrogen or the residue of the initiator used to prepare the functionalized oligomer.

The linking groups $L^2$ and $L^3$ respectively represent an organic divalent or trivalent linking group. Examples thereof include divalent or trivalent aliphatic including linear branched or cyclic aliphatic groups or aromatic groups. The linking groups $L^2$ and $L^3$ generally comprise between 1 and 30 carbon atoms, for example between 2 and 12 carbon atoms.

The terminal group $Q^3$ represents a hydrocarbon group, optionally partially or fully fluorinated, that may contain one or more catenary or non-catenary hetero-atoms. $Q^3$ generally has between 1 and 50 carbon atoms. The terminal group $Q^3$ may for example represent the residue of a monofunctional isocyanate reactive compound, for example of an isocyanate reactive compound as described above, obtained by removal of the isocyanate reactive group. Examples for $Q^3$ include monovalent aliphatic including linear branched or cyclic aliphatic groups or aromatic groups, a partially or fully fluorinated aliphatic group or a partially or fully fluorinated polyether group. Particular useful examples for end groups $Q^3$ include linear or branched aliphatic terminal moieties of at least 8 carbon atoms.

Linking group $L^4$ represents an aromatic or aliphatic hydrocarbon group that may optionally contain one or more caternary or non-catenary hetero-atoms. The linking group $L^4$ may for example represent the residue of a difunctional isocyanate reactive compound, for example as described above, obtained after removing the isocyanate reactive groups therefrom. Examples thereof include divalent aliphatic groups including linear branched or cyclic aliphatic groups or aromatic groups as well as partially or fully fluorinated aliphatic groups. The aliphatic groups may contain one or more caternary or non-catenary heteroatoms such as oxygen and nitrogen. Particular suitable example of $L^4$ include:

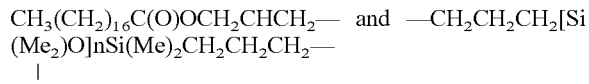
$CH_3(CH_2)_{16}C(O)OCH_2CHCH_2$— and —$CH_2CH_2CH_2[Si(Me_2)O]nSi(Me)_2CH_2CH_2CH_2$—

It will further be appreciated by one skilled in the art that the preparation of the carbodiimide results in a mixture of compounds and accordingly, general formula (IV) should be understood as representing a mixture of compounds whereby the indices q, m, t, and s in formula (IV) represent the molar amount of the corresponding unit in such mixture.

After completion of the carbodiimidization reaction, the final reaction mixture may be dispersed in water using a surfactant or mixture of surfactants in an amount sufficient to stabilize the dispersion. A typical dispersion will contain water in an amount of about 70 to 20000 parts by weight based on 100 parts by weight of carbodiimide compound or mixture of carbodiimide compounds. The surfactant or mixture of surfactants is preferably present in an amount of about 1 to 25 parts by weight, preferably about 5 to 15 parts by weight based on 100 parts by weight of the carbodiimide compound or mixture of carbodiimide compounds. Conventional cationic, non-ionic, anionic and Zwitterionic surfactants and mixtures of nonionic and charged surfactants are suitable.

Commercially available surfactants that can be used include ARQUAD™ T-50, ARQUAD™ MCB-50, ETHOQUAD™ C-12 and ETHOQUAD™ 18-25 from Akzo-Nobel and TERGITOL™ TMN-6 and TERGITOL™ 15S30, available from Dow Chemical Company Suitable fluorinated compounds for use in the composition according to the invention include any of the fluorochemical group-containing organic compounds including polymeric and oligomeric compounds known in the art to impart water and oil repellency to substrates. These polymeric and oligomeric fluorinated compounds typically comprise one or more fluorochemical groups that contain a perfluorinated carbon chain having from 3 to about 20 carbon atoms, typically from about 4 to about 14 carbon atoms. These fluorochemical groups can contain straight chain, branched chain, or cyclic fluorinated alkylene groups or any combination thereof. The fluorochemical groups are preferably free of polymerizable olefinic unsaturation but can optionally contain catenary heteroatoms such as oxygen, divalent or hexavalent sulfur, or nitrogen. Fully-fluorinated groups are preferred, but hydrogen or chlorine atoms can also be present as substituents, provided that no more than one atom of either is present for every two carbon atoms. It is additionally preferred that any fluorochemical group contain from about 40% to about 80% fluorine by weight, more preferably about 50% to about 78% fluorine by weight. The terminal portion of the group is generally fully-fluorinated, preferably containing at least 7 fluorine atoms. Perfluorinated aliphatic groups (i.e., those of the formula $C_nF_{2n+1}$—) are the most preferred fluorochemical groups.

Representative examples of suitable fluorinated compounds include fluorochemical urethanes, ureas, esters, ethers, alcohols, epoxides, allophanates, amides, amines (and salts thereof), acids (and salts thereof), carbodiimides, guanidines, oxazolidinones, isocyanurates, biurets, acrylate and methacrylate homopolymers and copolymers, and mixtures thereof.

In one particular embodiment, the fluorinated compound comprises a fluorinated polymer comprising one or more repeating units derived from a fluorinated monomer corresponding to the formula (VII):

$$R^f\text{-}L^5\text{-}C(R)=CR_2 \qquad (VII)$$

wherein $R^f$ represents a fluorinated aliphatic group or a perfluorinated polyether group, $L^5$ represents an organic divalent linking group, and each R independently represents hydrogen or a lower alkyl group having 1 to 3 carbon atoms.

The fluorinated aliphatic group $R^f$, in the fluorinated monomer is a typically a perfluorinated aliphatic group. It can be straight chain, branched chain, or cyclic or combinations thereof. The $R^f$ radical has at least 3 and up to 18 carbon atoms, preferably 3 to 14, especially 4 to 10 carbon atoms, and preferably contains about 40% to about 80% fluorine by weight, more preferably about 50% to about 79% fluorine by weight. The terminal portion of the $R^f$ radical is a perfluorinated moiety, which will preferably contain at least 7 fluorine atoms, e.g., $CF_3CF_2CF_2$—, $(CF_3)_2CF$—, $F_5SCF_2$—. The preferred $R^f$ radicals are those perfluorinated aliphatic radicals of the formula $C_nF_{2n+1}$— where n is 3 to 18, particularly 4 to 10. Compounds wherein the $R^f$ radical is a $C_4F_9$— are generally more environmentally acceptable than compounds where the $R^f$ radical consists of a perfluorinated group with more carbon atoms.

The $R^f$ group can also be a perfluorinated polyether group. The perfluorinated polyether group $R^f$ can include linear, branched, and/or cyclic structures, that may be saturated or unsaturated, and substituted with one or more oxygen atoms. It is preferably a perfluorinated group (i.e., all C—H bonds are replaced by C—F bonds). More preferably, it includes perfluorinated repeating units selected from the group of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, —$(CF_2CF(Z)O)$—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. The terminal groups can be $(C_nF_{2n+1})$— or $(C_nF_{2n+1}O)$—. In these repeating units or terminal groups, n is 1 or more, and preferably about 1 to about 4. Particularly preferred approximate average structures for a perfluoropolyether group include $C_3F_7O(CF(CF_3)CF2O)_pCF(CF_3)$— and $CF_3O(C_2F_{40})_pCF_2$— wherein an average value for p is 1 to about 50. As synthesized, these compounds typically include a mixture of polymers. The approximate average structure is the approximate average of the mixture of polymers.

The organic divalent linking group $L^5$ in the above formula (VII) links the perfluorinated aliphatic group or the perfluorinated polyether group Rf to the free radical polymerizable group and is a generally non-fluorinated organic linking groups. The linking group can be a chemical bond, but preferably contains from 1 to about 20 carbon atoms and may optionally contain oxygen, nitrogen, or sulfur-containing groups or a combination thereof. The linking group is preferably free of functional groups that substantially interfere with free-radical oligomerization (e.g., polymerizable olefinic double bonds, thiols, and other such functionality known to those skilled in the art). Examples of suitable organic divalent linking groups include: *—$COQ'R^1Q''CO$—, *—$COOCH_2CH(OH)R^1Q'CO$—, *-$L'Q'CONHL''$-, *—$R^1Q'CO$—*—$COQ'R^1$—, —$R'$—, *—$COQ'R^1Q'$—, *—$SO_2NRaR^1Q'$—,*—$SO_2NRaR^1$—, and *—$SO_2NR^a$—$R^1Q'CO$—, wherein Q' and Q" independently represent O or $NR^a$, $R^a$ is hydrogen or an alkyl group of 1 to 4 carbon atoms, $R^1$ represents a linear, cyclic or branched alkylene group that may be interrupted by one or more heteroatoms such as O or N, L', and L" each independently represent a non-fluorinated organic divalent linking group including for example an alkylene group, a carbonyl group, a carbonamido alkylene group and/or carboxy alkylene group, and * indicates the position where the linking group is attached to the group $R^f$ in formula (VII).

Fluorinated monomers $R^f$-$L^5C(R)$=$CR_2$ as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Perfluoropolyetheracrylates or methacrylates are described in U.S. Pat. No. 4,085,137.

Particularly suitable examples of fluorinated monomers include:
$CF_3(CF_2)_3CH_2CH_2OCOC(R')$=$CH_2$
$CF_3(CF_2)_3CH_2OCOC(R')$=$CH_2$
$CF_3(CF_2)_7CH_2CH_2OCOC(R')$=$CH_2$
$CF_3O(CF_2CF_2)_uCH_2OCOC(R')$=$CH_2$
$C_3F_7O(CF(CF_3)CF_2O)_uCF(CF_3)CH_2OCOC(R)$=$CH_2$
$C_3F_7O(CF(CF_3)CF_2O)_uCF(CF_3)CONHCH_2CH_2OCOC(R)$=$CH_2$
$CF_3CF_2CF_2CF_2O[CF(CF_3)CF_2O]_vCF(CF_3)CH_2OCOC(R)$=$CH_2$ (v average 1.5)

wherein R' represents hydrogen or methyl, R" represents methyl, ethyl or n-butyl and u is about 1 to 25.

The fluorinated monomer according to formula (VII) or mixture thereof is typically used in amounts such that the amount of the corresponding units thereof in the polymer is between 10 and 97 mole %, preferably between 25 and 97 mole %, more preferably between 25 mole % and 85 mole %, most preferably between 25 mole % and 75 mole %.

The fluorinated monomer according to formula (VII) is generally copolymerized with one or more non-fluorinated monomers. In one embodiment, at least part of the non-fluorinated monomers is selected from chlorine containing monomers such as vinyl chloride and vinylidene chloride. Repeating units of such chlorine containing monomers, when present, are preferably contained in the fluorinated polymer in an amount between 3 and 75 mole %.

Further non-fluorinated comonomers, other than the chlorine containing monomers referred to above, include hydrocarbon group containing monomers such as monomers that can be represented by formula (VIII):

$$R^hL^6E \qquad\qquad (VIII)$$

wherein $R^h$ represents an aliphatic group having 4 to 30 carbon atoms, $L^6$ represents an organic divalent linking group, and E represents an ethylenically unsaturated group. The hydrocarbon group is preferably selected from the group consisting of a linear, branched or cyclic alkyl group, an aralkyl group, an alkylaryl group and an aryl group. Further non-fluorinated monomers include those wherein the hydrocarbon group in formula (VIII) includes oxyalkylene groups or substituents, such as hydroxy groups and/or cure sites.

Examples of non-fluorinated comonomers include hydrocarbon esters of an α,β-ethylenically unsaturated carboxylic acid. Examples include n-butyl(meth)acrylate, isobutyl (meth)acrylate, octadecyl(meth)acrylate, lauryl(meth)acrylate, cyclohexyl (meth)acrylate, cyclodecyl (meth)acrylate, isobornyl (meth)acrylate, phenyl (meth)acrylate, benzyl (meth)acrylate, adamantyl (meth)acrylate, tolyl (meth)acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth)acrylate, cetyl (meth)acrylate, stearyl (meth)acrylate, behenyl (meth)acrylate, isooctyl (meth)acrylate, n-octyl (meth)acrylate, 4-ethyl-cyclohexyl (meth)acrylate, 2-ethoxyethyl methacrylate and tetrahydropyranyl acrylate. Further non-fluorinated comonomers include allyl esters such as allyl acetate and allyl heptanoate; alkyl vinyl ethers or alkyl allyl ethers such as cetyl vinyl ether, dodecylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, aminoalkyl (meth)acrylates such as N,N-diethylaminoethylmethacrylate, N-t-butylaminoethylmethacrylate; alkyl(meth)acrylates having an ammonium group such as (meth)acrylates of the formula $X—R_3N^+—R^a—OC(O)—CR^1=CH_2$ wherein X— represents an anion such as e.g. a chloride anion, R represents hydrogen or an alkyl group and each R may be the same or different, $R^a$ represents an alkylene and $R^1$ represents hydrogen or methyl; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, hydrocarbon monomers comprising (poly)oxyalkylene groups including (meth)acrylates of a polyethylene glycol, (meth) acrylates of a block copolymer of ethylene oxide and propylene oxide, (meth)acrylates of amino- or diamino terminated polyethers and (meth)acrylates of methoxypolyethyleneglycols and hydrocarbon monomers comprising a hydroxyl group include hydroxyl group containing (meth) acrylates, such as hydroxyethyl(meth)acrylate and hydroxypropyl(meth)acrylate.

In a particular embodiment of the invention, the fluorinated polymer comprising units deriving from a monomer according to formula (VII) further includes units having one or more cure sites. These units will typically derive from corresponding comonomers that include one or more cure sites. By the term 'cure site' is meant a functional group that is capable of engaging in a reaction with the substrate to be treated. Examples of cure sites include acid groups such as carboxylic acid groups, hydroxy groups, amino groups and isocyanate groups or blocked isocyanate groups. Examples of comonomers from which a cure site unit may derive include (meth)acrylic acid, maleic acid, maleic anhydride, allyl methacrylate, hydroxybutyl vinyl ether, N-hydroxymethyl (meth)acrylamide, N-methoxymethyl acrylamide, N-butoxymethyl acrylamide, N-isobutoxymethyl acrylamide, glycidylmethacrylate and α,α dimethyl m. isopropenyl benzyl isocyanate. Other examples include polymerizable urethanes, that can be obtained by the reaction of a polymerizable mono-isocyanate with an isocyanate blocking agent or by the reaction of a di- or poly-isocyanate and a hydroxy or amino-functionalized acrylate or methacrylate and an isocyanate blocking agent. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly)isocyanate compound thereby generating the isocyanate group again which can then react with an isocyanate reactive group. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14-172.

The blocked isocyanate may be aromatic, aliphatic, cyclic or acyclic and is generally a blocked di- or triisocyanate or a mixture thereof and can be obtained by reacting an isocyanate with a blocking agent that has at least one functional group capable of reacting with an isocyanate group. Preferred blocked isocyanates are blocked polyisocyanates that at a temperature of less than 150° C. are capable of reacting with an isocyanate reactive group, preferably through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Particular examples of comonomers having a blocked isocyanate group as the cure site include the reaction product of a di-isocyanate, 2-hydroxyethyl(meth)acrylate, and 2-butanone oxime or the reaction product of a di-isocyanate, a mono(meth)acrylate of a polyethylene glycol and 2-butanone oxime and the reaction product of a triisocyanate, 1 equivalent of 2-hydroxyethyl(meth)acrylate and 2 equivalents of 2-butanone oxime and the reaction product of α,α-dimethyl m. isopropenyl benzyl isocyanate with 2-butanone oxime.

In yet a further embodiment in connection with the present invention, the fluorochemical compound used in the composition is an alkylated fluorochemical oligomer as disclosed in U.S. Pat. No. 6,525,127. The alkylated fluorochemical oligomers disclosed in this US patent comprise:
(i) a fluorochemical oligomeric portion comprising an aliphatic backbone with a plurality of fluoroaliphatic groups attached thereto, each fluoroaliphatic group having a fully fluorinated terminal group and each independently linked to a carbon atom of the aliphatic backbone through an organic linking group;
(ii) an aliphatic moiety having at least 12 carbon atoms; and
(iii) a linking group which links the fluorochemical oligomeric portion to the aliphatic moiety.

The compositions comprising a fluorinated compound and a carbodiimide or mixture of carbodiimides can be prepared by blending aqueous dispersions of the carbodiimide or mixture of carbodiimide and fluorinated compound. In order to improve fixing of the composition of the invention to a substrate, it is sometimes advantageous to include in the dispersion certain additives, polymers, thermo-condensable products and catalysts capable of promoting interaction with the substrate. Among these are the condensates or precondensates of urea or melamine with formaldehyde (sometimes referred to herein as resins) and glyoxal resins. Particular suitable additives and amounts thereof can be selected by those skilled in the art.

The amount of the treating composition applied to a substrate should generally be chosen so that sufficiently high or desirable water and oil repellencies are imparted to the substrate surface, said amount usually being such that 0.01% to 5% by weight, preferably 0.05% to 2% by weight, based on the weight of the substrate, of water repellent composition (fluorinated compound and carbodiimide compound or mixture of carbodiimide compounds) is present on the treated substrate. The amount which is sufficient to impart desired repellency can be determined empirically and can be increased as necessary or desired.

The carbodiimide compound or mixture of carbodiimide compounds is generally present in the treating composition in an amount sufficient to improve the fluorine efficiency of the fluorinated compound. "Improvement in fluorine efficiency" as used herein designates that improved or equal repellency properties are obtained when part of the fluorinated compound, preferably 10 to 50% by weight of fluorinated compound, is replaced by the carbodiimide. Generally, the carbodiimide compound or mixture of carbodiimide compounds is present in an amount of about 5 to about 500, preferably about 10 to about 200, and most preferably about 25 to about 100 parts by weight based on 100 parts by weight of the fluorinated compound.

The composition of this invention can be applied using conventional application methods and can particularly be used as an aqueous dispersion. A dispersion will generally contain water, an amount of composition effective to provide repellent properties to a substrate treated therewith, and a surfactant in an amount effective to stabilize the dispersion. Water is preferably present in an amount of about 70 to about 20000 parts by weight based on 100 parts by weight of the composition of the invention. The surfactant is preferably present in an amount of about 1 to about 25 parts by weight, preferably about 5 to about 10 parts by weight, based on 100 parts by weight of the inventive composition. Conventional cationic, nonionic, anionic, Zwitterionic surfactants or mixtures thereof are suitable.

Optional Additives—(C)

Also useful in the present invention are additional additives. Among the fluorine-free compounds useful as treatment extenders are siloxanes, acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensation of fatty acids with polyamides and their epichlorohydrin adducts, waxes, polyethylene, chlorinated polyethylene, alkyl ketene dimers, esters, and amides. Blends of these fluorine-free extender compounds are also considered useful. The relative amount of the extender compounds in the treatment is not critical to the present invention. The overall composition of the fluorochemical treatment should contain, however, relative to the mount of solids present in the overall system, at least 3 weight percent, preferably at least about 5 weight percent, carbon-bound fluorine.

Applications

As discussed above, compositions of the invention comprise blends of (A) one or more ester oligomers and (B) one or more polycarbodiimides. In many embodiments, the weight ratio of (A) to (B) will be from about 95:5 to about 5:95, preferably from about 75:25 to about 25:75, and most preferably from about 60:40 to about 40:60. In addition, they may further comprise an effective amount of one or more other additives, i.e., (C), e.g., melamine, cross linker, etc.

The coating compositions of the present invention comprise aqueous suspensions, emulsions, or solutions, or organic solvent (or organic solvent/water) solutions, suspensions, or emulsions comprising the fluorochemical compositions of the present invention. When applied as coatings, the fluorochemical coating compositions impart oil- and water-repellency properties, and/or stain-release and stain-resistance characteristics to any of a wide variety of substrates.

The fluorochemical compositions of the present invention can be dissolved, suspended, or dispersed in a variety of solvents to form coating compositions suitable for use in coating the chemical compositions of the present invention onto a substrate. Aqueous suspensions, emulsions, or solutions are generally preferred and generally can contain a non-volatile solids content of about 0.1 to about 50 percent by weight (based on the total weight of the components). Depending upon the substrate to which the composition is being applied, water is the preferred solvent because it does not raise any environmental concerns and is accepted as safe and non-toxic.

Another embodiment of the present invention is an article comprised of a substrate having one or more surfaces and on the one or more surfaces of this substrate is a cured coating derived from the coating composition of the present invention. After application and curing of the coating composition, the article displays high water and hexadecane dynamic receding contact angles, oil- and water-repellency, and/or stain-release and stain-resistance properties.

The coating compositions of the present invention can be applied to a wide variety of substrates, including, but not limited to, fibrous substrates, leather substrates, and hard substrates. Illustrative examples of fibrous substrates include woven, knit, and nonwoven fabrics (e.g., of natural, synthetic, and natural/synthetic blends including, for example, cotton, linen, wool, silk, polyester, nylon, and blends of such fibers), laminates (e.g., nylon or polyester fabric bonded to expanded polytetrafluoroethylene ("PTFE") such as are used in GORE™ membranes), textiles, carpets, leather, and paper. Illustrative examples of hard substrates include, but are not limited to, glass, ceramic, masonry, concrete, natural stone, man-made stone, metals, wood, plastics, and painted surfaces. Substrates can have flat or curved surfaces and may be particulate and fibrous in nature, as well. Preferred substrates are fibrous or are capable of imbibing a liquid and are therefore porous. Such substrates are particularly subject to staining and soiling, but also benefit greatly from the fluorochemical compositions of the present invention because the coating composition can penetrate into the fibrous or porous substrate surface and spread over the internal surfaces of the substrate.

Representative examples of substrates that can be coated with the coating composition include lenses used in ophthalmic spectacles, sunglasses, optical instruments, illuminators, watch crystals, and the like; plastic window glazing; signs; decorative surfaces such as wallpaper and vinyl flooring; composite or laminated substrates such as FORMICA™ brand sheeting or laminated flooring (e.g., PERGO™ brand flooring); ceramic tile and fixtures (sinks, showers, toilets); natural and man-made stones; decorative and paving stones; cement and stone sidewalks and driveways; particles that comprise grout or the finished surface of applied grout; wood furniture surface (desktops, tabletops); cabinet surfaces; wood flooring, decking, and fencing; leather; paper; fiber glass fabric and other fiber-containing fabrics; textiles; carpeting; drapery material, upholstery, clothing, and the like.

Since coatings prepared from the coating compositions can render metal surfaces resistant to soils, the optical properties of metal surfaces like those on decorative metal strips and mirrors can be preserved longer. The coating compositions can make wood surfaces more resistant to food and beverage stains while helping to maintain a lustrous appearance. In addition, the coating compositions can be applied as a protective coating on aircraft wings, boat hulls, fishing line, medical surfaces, and siding, and can be used in food release, mold release, adhesive release applications, and the like. Decorative stones include, for example, marble, granite, limestone, slate, and the like.

Preferred substrates that can be coated with the coating composition of the present invention are fibrous substrates, such as nonwoven, knits, and woven fabrics, laminates, carpet, drapery material, upholstery, clothing and essentially any textile. To impart repellency and/or stain-resistance characteristics to a substrate having one or more surfaces, (a) the coating composition of the present invention is applied onto one or more surfaces of the substrate and (b) the coating composition is allowed to cure (i.e., dry) at ambient temperature or preferably at elevated temperatures. The use of elevated temperatures is particularly advantageous for curing fibrous substrates coated with the fluorochemical compositions of the present invention, since best repellency properties are then achieved. Elevated temperatures of about 50 to about 175° C. are preferred with about 100 to about 170° C. typically being more preferred.

The coating compositions can be applied to a treatable substrate by standard methods such as, for example, spraying, padding, dipping, roll coating, brushing, or exhaustion (optionally followed by the drying of the treated substrate to remove any remaining water or solvent). The treatable substrate can be in the form of molded or blown articles, sheets, fibers (as such or in aggregated form, for example, yarn, toe, web, or roving, or in the form of fabricated textiles such as carpets), woven and nonwoven fabrics, films, etc. When coating flat substrates of appropriate size, knife-coating or bar-coating may be used to ensure uniform coatings of the substrate. If desired, the fluorochemical composition can be co-applied with conventional fiber treating agents, for example, spin finishes or fiber lubricants. Such a topical treatment process can involve the use of the neat fluorochemical composition, without added solvent, and is thus preferred from an environmental perspective over the use of organic solvent solutions of the fluorochemical composition.

The coating compositions can be applied in an amount sufficient to achieve the desired repellency properties for a particular application. This amount can be determined empirically and can be adjusted as necessary or desired to achieve the repellency properties without compromising the properties of the treatable substrate.

The coating compositions can be applied to a substrate in any desired thickness. Coatings as thin as a few microns can offer excellent low surface energy, stain-resistance, and stain-release. However, thicker coatings (e.g., up to about 20 microns or more) can also be used. Thicker coatings can be obtained by applying to the substrate a single thicker layer of a coating composition that contains a relatively high concentration of the chemical composition of the present invention. Thicker coatings can also be obtained by applying successive layers to the substrate of a coating composition that contains a relatively low concentration of the fluorochemical composition of the present invention. The latter can be done by applying a layer of the coating composition to the substrate and then drying prior to application of a successive layer. Successive layers of the coating can then be applied to dried layers. This procedure can be repeated until the desired coating thickness is achieved.

The repellency-imparting, fluorochemical polymer composition can also find utility as an additive to coatings. Such coatings can be water- and oil-repellent, and scratch-resistant (as well as soil-resistant) and can be used in the photographic industry or as protective coatings for optical or magnetic recording media.

If desired, the water- and oil-repellent composition of the invention can further contain one or more additives, including those commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the repellency characteristics in, for example, melt additive polyolefin applications.

In order to effect treatment of a substrate, the dispersion can be sprayed on the substrate or the substrate can be immersed in the dispersion and agitated until it is saturated. The saturated substrate can then be run through a padder/roller to remove excess dispersion. The composition in accordance with the present invention is particularly suitable for use in an application method where the composition is applied to the substrate by contacting the substrate with the composition in a bath that contains the composition and wherein the substrate is guided over one or more rolls. Typically, such rolls are configured so as to squeeze excess treatment composition from the substrate.

Following application of the composition to the substrate, the substrate will generally be dried. The substrate may be dried at ambient conditions by leaving the substrate exposed to air for a certain period of time. Good and effective repellency properties may be obtained with compositions according to the invention even when drying at ambient conditions (generally at 20 to 30° C.). Alternatively, the substrate may be exposed to heat subsequent to the application of the composition to accelerate drying of the substrate and/or to cause curing of the applied composition if desired or necessary. When exposed to a heat temperature, the substrate may be guided through an oven and the temperature of heat treatment may be between 100 and 200° C., typically between 120 and 180° C.

The amount of the treating composition applied to a substrate in accordance with this invention is chosen so that sufficiently high or desirable water and oil repellencies are imparted to the substrate surface, said amount usually being such that 0.01% to 5% by weight, preferably 0.05% to 2% by weight, based on the weight of the substrate, of water repellent composition (fluorinated compound and carbodiimide) is present on the treated substrate. The amount which is sufficient to impart desired repellency can be determined empirically and can be increased as necessary or desired.

The substrates treated by the water and oil repellency imparting composition of this invention are not especially limited and include, e.g. textile fabrics, fibres, nonwovens, leather, paper, carpet, plastic, wood, metal, glass, concrete and stone. Preferred are textile fabrics, fibres and non-wovens.

Examples

Objects and advantages of this invention are further illustrated by the following illustrative examples, but the particular materials and amounts thereof recited in these examples, as well as other conditions and details, should not be construed to unduly limit this invention. In the examples, where weight percent or parts by weight are indicated, these are based on the weight of the entire composition unless indicated otherwise.

Formulation and Treatment Procedure:

Treatment baths were formulated containing a defined amount of the fluorochemical treatment composition. Treatments were applied to the test substrates bypadding to provide a concentration as indicated in the examples (based on fabric weight and indicated as SOF (solids on fabric)). Samples were air dried at ambient temperature for 24-48 hours followed by conditioning at about 21° C. and about 50% relative humidity for 2 hours (air cure). Alternatively, the samples were dried and cured, e.g., at about 150 to about 170° C. for about 1 to 5 minutes.

After drying and heat cure, the substrates were tested for their repellency properties.

Materials

ODDA—octadecanedioic acid, $HO(O)C(CH_2)_{16}C(O)OH$, from Cognis Corporation, Cincinnati, Ohio.

FBSEE—$C_4F_9SO_2N(C_2H_4OH)_2$, can be prepared as described in Example 8 of U.S. Pat. No. 3,787,351 (Olson), except that equimolar amount of $C_4F_9SO_2NH_2$ is substituted for $C_8F_{17}SO_2NH_2$; $C_4F_9SO_2NH_2$ can be prepared by reacting perfluorobutane sulfonyl fluoride ("PBSF") with an equimolar amount of $NH_3$.

MeFBSE—$C_4F_9SO_2N(CH_3)CH_2CH_2OH$, having an equivalent weight of 357, can be made in two stages by reacting PBSF with methylamine and ethylenechlorohydrin, using a procedure as described in Example 1 of U.S. Pat. No. 2,803,656 (Ahlbrecht, et al.).

C6 telomer—FLUOWET EA 600 from Clariant Corp.

C4 telomer—1H,1H,2H,2H—Nonafluoro-1-hexanol from TCI America, Portland, Oreg.

SA—Stearyl alcohol (1-octadecanol).

ETHOQUAD™ C12—dodecyl trimethyl ammonium chloride (75% in $H_2O$), from Akzo-Nobel, TERGITOL™ 15-S-30—$C_{12-16}$ alkyl polyoxyethylene (30 EO) surfactant, from Rohm & Haas TERGITOL™ TMN-6—trimethyl nonane polyoxyethylene (6 EO) surfactant, from Rohm & Haas.

MIBK—methyl isobutyl ketone, 4-methyl-2-pentanone.

Test Methods

Spray Rating (Spray):

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and was expressed in terms of a 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

Oil Repellency (OR):

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to NUJOL® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

Standard Test Liquids

| AATCC Oil Repellency Rating Number | Compositions |
| --- | --- |
| 1 | NUJOL ® |
| 2 | NUJOL ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Bundesmann Test:

In order to evaluate dynamic water repellency performance, the impregnating effect of rain on treated substrates was determined using the Bundesmann Test Method (DIN 53888). In this test, the treated substrates were subjected to a simulated rainfall, while the back of the substrate was being rubbed. The appearance of the upper exposed surface was checked visually after 1, 5, and 10 minutes and was given a rating between 1 (complete surface wetting) and 5 (no water remains on the surface). Generally, Bundesmann testing was only carried out if the initial spray rating for the samples was 95 or greater.

Laundering Procedure:

The procedure set forth below was used to prepare treated substrate samples designated in the examples below (i.e., 1 L indicates 1 complete wash and rinse cycle, 5 L indicates 5 complete wash and rinse cycles, etc.).

A 230 g sample of generally square, 400 cm² to about 900 cm² sheets of treated substrate was placed in a washing machine along with a ballast sample (1.9 kg of 8 oz fabric in the form of generally square, hemmed 8100 cm² sheets). A commercial detergent (SAPTON Brand Detergent, from Henkel, Germany, 46 g) was added and the washer was filled to high water level with hot water (40° C.+/−3° C.). The substrate and ballast load were washed using a 12-minute normal wash cycle followed by rinsing and centrifuging in each wash and rinse cycle. The samples were not dried between repeat cycles but were dried after the final cycle.

Test Materials (A) Ester Oligomers

For the examples shown in Tables 1-04, polyesters from C18-Diacid/FBSEE/MEFBSE (molar ratio 1/0.75/0.5): To a round bottom flask attached with a Dean-Stark trap was added C18-diacid 30 g (0.095 moles), FBSEE 27.5 g (0.071 moles), MeFBSE 17.01 g (0.048 moles), toluene 100 g, and methanesulfonic acid 1 g. This mixture was allowed to reflux for 15 hrs at 115° C. When the desired amount of water (3 g) was collected, the temperature was reduced to 80° C. and to this was added potassium carbonate. After mixing for 30 minutes this mixture was hot filtered and the solvent rotovaped.

To the above polymer solid 20 g was added MIBK 50 g and heated to 65° C. In a separate beaker was added water (100 g), ETHOQUAD™ C/12 (0.53 g), TERGITOL™ 15-S-30 (0.6 g), and TMN-6 (1.2 g). This solution was heated to 65° C. and to this stirring solution was slowly added the polymer in MIBK. This mixture as sonicated for 4 min and the solvent removed via rotovap.

All polyesters in Tables 1-4 were made according to the procedure described above, except C14-diacid or C-12 diacid were substituted for C18-diacid as indicated in the molar ratios indicated. In one example, the MeFBSE was replaced with C6 telomer alcohol, as noted in the table.

Ester A: To a round-bottom reaction flask equipped with a stirrer, heater and a Dean-Stark trap was added ODDA (30 g, 0.095 moles), FBSEE (27.5 g, 0.071 moles), MeFBSE (17.01 g, 0.048 moles), heptane (100 g) and methanesulfonic acid (1 g). The resulting mixture was allowed to reflux for 5 hours at 100° C. When the desired amount of water (3 g) was collected, the temperature was reduced to 80° C. Then triethylamine (1.10 g) was added and the mixture was stirred for an additional 30 minutes. The heptane was then removed by distillation. A sample (40 grams) of the remaining polyester solid was dissolved in 80 g methyl isobutyl ketone (MIBK) in a three-necked 500 mL round-bottomed flask. The mixture was heated to 65° C. Separately, to 200 g deionized water was added 1.71 g of VGH-70 (70% solids), 2.1 g of TERGITOL™ TMN-6 (90% solids), and 15 grams dipropylene glycol monomethyl ether. The water mixture was heated to 65° C., then slowly added to the polyester mixture with rapid agitation. After mixing for 15 minutes, the contents of the flask were passed through a homogenizer two times at a pressure of 2500 psig. The resulting emulsion was stripped of MIBK by vacuum distillation at 35° C. The resulting emulsion was 18.5% solids.

Ester B: Polyester B was prepared as Polyester A above, except that the triethylamine/acid salt was removed by filtration from the heptane prior to removing the heptane by distillation. The sample was emulsified as Polyester A except that the dipropylene glycol monomethyl ether was not added to the water phase. The resulting emulsion was 21.3% solids.

Ester C: Polyester C was the C14 polyester used in the examples reported in Tables 1-4.

(B) Polycarbodiimides

PCD-2:

4 MDI/isostearylalcohol/(8iBMA-HSCH$_2$CH$_2$OH), further indicated as PCD-2, prepared as described in U.S. Publication No. 2006/0094851.

PCD-3:

4 MDI/0.5 isostearyl alcohol/0.5 stearylalcohol/(8 iBMA-HSCH2CH$_2$OH) prepared as described in U.S. Publication No. 2006/0094851.

(C) Other Additives

The melamine-formaldehyde condensate used in the examples of the present invention is AEROTEX®-M3, from the AEROTEX® Resins line of crosslinkers, available from Emerald Performance Materials (Emerald Carolina Chemical, LLC; Charlotte, N.C.). Useful catalysts for curing the glyoxal resins and melamine resins include metal salts as well as amines. The catalysts used with the AEROTEX®-M3 resin included FREECAT® MX accelerator, as well as the FREECAT® UTX-2 accelerator. The FREECAT® UTX-2 accelerator is preferred. Both catalysts were also obtained from Emerald Carolina Chemical, LLC; Charlotte, N.C.

Fluoroalkyl acrylate FC1:

45% solids aqueous dispersion comprising a fluorochemical acrylate having the following monomer composition $C_4F_9SO_2N(CH_3)CH_2CH_2OCOC(CH_3)=CH_2/VCL_2/$ODMA (weight ratio: 60/20/20) and an emulsifier system of 2% ETHOQUAD™ C-12/5.4% TERGITOL™ TMN-6 and 3% TERGITOL™ 15S30 based on fluorochemical acrylate solids.

Copolymers of the fluoroalkyl acrylate blended with the polycarbodiimide extender (FC1/PCD-2, in 60:40 weight ratio) were blended with C14 and C18 fluorochemical polyesters, having the compositions and blend ratios as shown in Tables 1 and 2.

Flouroalkyl Acrylate FC2:

The fluorochemical acrylate of the blend series in Tables 8-11 was prepared by charging mercaptoethanol (40.8 g, 0.52 moles), MeFBSEA (859.2 g, 2.09 moles) and 600 g ethyl acetate to a 3 L flask equipped with overhead stirring, condenser, thermocouple and nitrogen purge. The mixture was heated to 75° C. A charge of 3.60 g VAZO 67 was added and the mixture was reacted for 8 hours. An additional 3.6 g VAZP 67 was added, and the mixture was reacted 8 additional hours. The solution was transferred to bottles. A 25 g portion of the solution (74% solids in EtOAc) was emulsified by adding 10 additional grams of ethyl acetate and heating to 60° C. Separately, 50 g of deionized water was mixed with 3.16 g of ETHOQUAD™ 18/25 (29.3% solids). The mixture of water/surfactant was added to the ethyl acetate solution and mixed well. After two passes on the homogenizer, the ethyl acetate was removed via rotary evaporator to leave an aqueous emulsion at 22.5% solids.

Substrates

Untreated nylon or polyester microfiber fabric were used in all examples except Tables 8 and 9. Nylon laminate: a two layer laminate of a 86 g/m$^2$ woven nylon fabric bonded to a 35 g/m$^2$ expanded PTFE (porosity of 80%) membrane partially impregnated with a monolithic urethane coating, obtained from W. L. Gore and Associates, Inc., Elkton, Md.

Polyester laminate: a two layer laminate of a 78 g/m$^2$ woven polyester fabric bonded to a 35 g/m$^2$ expanded PTFE (porosity of 80%) membrane partially impregnated with a monolithic urethane coating, obtained from W. L. Gore and Associates, Inc., Elkton, Md.

On polyester fabric:

The molar ratios for each of the polyesters were 1/0.75/0.5.

TABLE 1

| Composition | % SOF | INIT O/R | BUNDESMAN | | | | 5L O/R | 5L SPRAY |
| --- | --- | --- | --- | --- | --- | --- | --- | --- |
| | | | INIT SPRAY | 1 MIN | 5 MIN | 10 MIN | TOTAL | |
| FC1-Control | 0.6 | 1 | 100 | 2 | 1 | 1 | 4 | 0 | 80 |
| C14 diacid/FBSEE/MEFBSE FC1/PCD-2 | 0.4 0.2 | 3 | 100 | 3.5 | 1 | 1 | 5.5 | 2 | 80 |
| C14 diacid/FBSEE/MEFBSE FC1/PCD-2 | 0.45 0.15 | 3.5 | 100 | 2 | 1 | 1 | 4 | 2 | 80 |
| C14 diacid/FBSEE/MEFBSEE FC1/PCD-2 | 0.3 0.3 | 3.5 | 100 | 3 | 1 | 1 | 5 | 2 | 80 |
| C 18 diacid/FBSEE/MEFBSE FC1/PCD-2 | 0.4 0.2 | 3.5 | 100 | 3 | 1 | 1 | 5 | 2 | 80 |
| C 18 diacid/FBSEE/MEFBSE FC1/PCD-2 | 0.45 0.15 | 3.5 | 100 | 3 | 1 | 1 | 5 | 1 | 80 |
| C 18 diacid/FBSEE/MEFBSE FC1/PCD-2 | 0.3 0.3 | 3.5 | 100 | 3.5 | 1 | 1 | 5.5 | 1 | 80 |

On nylon fabric:

TABLE 2

| Composition | % SOF | INIT O/R | INIT SPRAY | BUNDESMAN 1 MIN | 5 MIN | 10 MIN | TOTAL | 5L O/R | 5L SPRAY |
|---|---|---|---|---|---|---|---|---|---|
| FC1-Control | 0.6 | 4.5 | 100 | 5 | 4.5 | 4 | 13.6 | 2 | 100 |
| C14 diacid/FBSEE/MEFBSE FC1/PCD-2 | 0.4 0.2 | 4.5 | 100 | 5 | 4.5 | 3.5 | 13 | 4 | 100 |
| C14 diacid/FBSEE/MEFBSE FC1/PCD-2 | 0.45 0.15 | 4.5 | 100 | 4.5 | 4 | 3 | 11.5 | 3 | 95 |
| C14 diacid/FBSEE/MEFBSE FC1/PCD-2 | 0.3 0.3 | 4.5 | 100 | 5 | 3 | 2.5 | 10.5 | 4 | 100 |
| C 18 diacid/FBSEE/MEFBSE FC1/PCD-2 | 0.4 0.2 | 4.5 | 100 | 5 | 4.5 | 3.5 | 13 | 3.5 | 95 |
| C 18 diacid/FBSEE/MEFBSE FC1/PCD-2 | 0.45 0.15 | 4.5 | 100 | 5 | 4 | 3.5 | 12.5 | 3 | 95 |
| C 18 diacid/FBSEE/MEFBSE FC1/PCD-2 | 0.3 0.3 | 4.5 | 100 | 5 | 4 | 3.5 | 12.5 | 3.5 | 95 |

The ratios for each of the polyesters were 1/0.75/0.5.
b) Polycarbodiimides and Blocked Isocyanates Extenders
Carbodiimide extender PCD-3:
4 MDI/0.5 isostearyl alcohol/0.5 stearylalcohol/(8 iBMA-HSCH$_2$CH$_2$OH) prepared as described in U.S. Publication No. 2006/0094851

Polycarbodiimide extenders (PCD-2 and PCD-3) and blocked isocyanates extenders were blended with C12, C14, and C18 fluorochemical polyesters, having the compositions and blend ratios as shown in Tables 3 and 4.

TABLE 3

On nylon fabric:
In indicated molar ratios

| Composition | % SOF | INIT O/R | INIT SPRAY | BUNDESMAN 1 MIN | 5 MIN | 10 MIN | TOTAL | 5 L O/R | 5 L SPRAY |
|---|---|---|---|---|---|---|---|---|---|
| C18 diacid/FBSEE/C6 telomer (1/0.75/0.5) PCD-2 | 0.4 0.2 | 4 | 100 | 3 | 2 | 1 | 6 | 4 | 90 |
| C18 diacid/FBSEE/C6 telomer (1/0.75/0.5) XAN | 0.4 0.2 | 3.5 | 100 | 5 | 2 | 1 | 6 | 0 | 0 |
| C12 diacid/FBSEE/MEFBSE (1/0.5/1) PCD-3 | 0.4 0.2 | 3.5 | 85 | | | | | 0 | 70 |
| C12 diacid/FBSEE/MEFBSE (1/0.9/0.2) PCD-3 | 0.4 0.2 | 0 | 85 | | | | | 0.5 | 80 |
| C14 diacid/FBSEE/MEFBSE (1/0.5/1) PCD-3 | 0.4 0.2 | 3.5 | 100 | 4 | 1 | 1 | 6 | 0 | 75 |
| C14 diacid/FBSEE/MEFBSE (1/0.9/0.2) PCD-3 | 0.4 0.2 | 0.5 | 85 | | | | | 2 | 85 |
| C18 diacid/FBSEEI/MEFBSE (1/0.5/1) PCD-3 | 0.4 0.2 | 1 | 100 | 4 | 3 | 2 | 9 | 0 | 70 |
| C18 diacid/FBSEE/MEFBSE (1/0.9/0.2) PCD-3 | 0.4 0.2 | 0 | 100 | 2 | 1 | 1 | 4 | 1 | 80 |

TABLE 4

On polyester fabric:

| Composition | % SOF | INIT O/R | INIT SPRAY | BUNDESMAN 1 MIN | 5 MIN | 10 MIN | TOTAL | 5 L O/R | 5 L SPRAY |
|---|---|---|---|---|---|---|---|---|---|
| C18 diacid/FBSEE/C6 telomer (1/0.75/0.5) PCD-2 | 0.4 0.2 | 2 | 100 | 1 | 1 | 1 | 3 | 2 | 85 |
| C18 diacid/FBSEE/C6 telomer (1/0.75/0.5) XAN | 0.4 0.2 | 5 | 100 | 1 | 1 | 1 | 3 | 0 | 85 |
| C12 diacid/FBSEE/MEFBSE (1/0.5/1) PCD-3 | 0.4 0.2 | 2 | 85 | | | | | 0 | 75 |
| C12 diacid/FBSE/MEFBSE (1/0.9/0.2) PCD-3 | 0.4 0.2 | 0 | 80 | | | | | 0 | 80 |
| C14 diacid/FBSEE/MEFBSE(1/0.5/1) PCD-3 | 0.4 0.2 | 4 | 100 | 4.5 | 3.5 | 2 | 10 | 0 | 80 |
| C14 diacid/FBSE/MEFBSE (1/0.9/0.2) PCD-3 | 0.4 0.2 | 0 | 90 | | | | | 0.5 | 80 |

TABLE 4-continued

On polyester fabric:

| Composition | % SOF | INIT O/R | INIT SPRAY | BUNDESMAN 1 MIN | 5 MIN | 10 MIN | TOTAL | 5 L O/R | 5 L SPRAY |
|---|---|---|---|---|---|---|---|---|---|
| C18 diacid/FBSE/MEFBSE(1/0.5/1) PCD-3 | 0.4 0.2 | 2 | 100 | 3 | 3 | 2.5 | 8.5 | 0 | 75 |
| C18 diacid/FBSE/MEFBSE (1/0.9/0.2) PCD-3 | 0.4 0.2 | 0 | 80 | | | | | 0 | 75 |

Another useful examples of a blend of the invention is a 2:1 weight ratio blend of polyester ODDA/FBSEE/MEFBSE (1/0.75/0.5) with PCD-3. Performance data on treated nylon and polyester fabrics are summarized in Table 5-7 below.

TABLE 5

Bundesmann data

| Fabric | 1 min | 5 min | 10 min | total |
|---|---|---|---|---|
| Nylon | 2.5 | 2 | 1.5 | 6 |
| Polyester | 2 | 2 | 2 | 6 |

TABLE 6

Bundesman data after washing and reheating

| Fabric | 1 min | 5 min | 10 min | total |
|---|---|---|---|---|
| Nylon | 5 | 5 | 5 | 15 |
| Polyester | 5 | 5 | 5 | 15 |

TABLE 7

Bundesmann data after heating

| Fabric | 1 min | 5 min | 10 min | total |
|---|---|---|---|---|
| Nylon | 4.5 | 4.5 | 4 | 13 |
| Polyester | 5(W) | 5(W) | 5(W) | 15 |

Embodiments of the invention on laminate substrates are shown in Tables 8 and 9. C14 indicates the C14 polyester used in Tables 1-4, C18 is polyester A described above, and % SIB refers to the % solids in bath of the indicated treatment composition.

TABLE 8

Nylon Laminate Substrate

| Composition | | | | Ratings | | | | | | | | |
|---|---|---|---|---|---|---|---|---|---|---|---|---|
| Ester | PCD | Melamine/ Catalyst | FC-2 | Initial | | Bundesman (minutes) | | | | 1 L | | 5 L | |
| (% SIB) | (% SIB) | Y/N | (% SOF) | O/R | Spray | 1 | 5 | 10 | Total | O/R | Spray | O/R | Spray |
| C14 | 2.5 | 0 | N | 0 | 5 | 80 | 2 | 1 | 1 | 4 | 4 | 70 | 0 | 50 |
| C14 | 2.5 | 0 | Y | 0 | 5 | 80 | 2 | 1 | 1 | 4 | 5 | 80 | 1 | 60 |
| C14 | 2.5 | 1.25 | N | 0 | 3.5 | 100 | 4 | 3 | 2 | 9 | 5 | 100 | 5 | 100 |
| C14 | 2.5 | 1.25 | Y | 0 | 4 | 100 | 3.5 | 2.5 | 2 | 8 | 5 | 100 | 5 | 100 |
| C14 | 2.5 | 1.25 | Y | 0.05 | 5 | 100 | 5 | 4 | 4 | 13 | 5 | 100 | 5 | 100 |
| C18 | 2.5 | 0 | N | 0 | 3 | 100 | 2.5 | 1.5 | 1.5 | 5.5 | 2 | 75 | 0 | 60 |
| C18 | 2.5 | 0 | Y | 0 | 3.5 | 100 | 4 | 3 | 3 | 10 | 3 | 95 | 0 | 70 |
| C18 | 2.5 | 1.25 | N | 0 | 2 | 100 | 3 | 2.5 | 2.5 | 8 | 5 | 100 | 5 | 100 |
| C18 | 2.5 | 1.25 | Y | 0 | 3 | 100 | 4 | 3 | 3 | 10 | 5 | 100 | 5 | 100 |
| C18 | 2.5 | 1.25 | Y | 0.05 | 5 | 100 | 4.5 | 4.5 | 4 | 13 | 5 | 100 | 5 | 100 |

TABLE 9

Polyester Laminate Substrate

| | Composition | | | | Ratings | | | | | | | | |
|---|---|---|---|---|---|---|---|---|---|---|---|---|---|
| | Ester | PCD | Melamine/Catalyst | FC-2 | Initial | | Bundesman (minutes) | | | | 1 L | | 5 L | |
| | (% SIB) | (% SIB) | Y/N | (% SOF) | O/R | Spray | 1 | 5 | 10 | Total | O/R | Spray | O/R | Spray |
| C14 | 2.5 | 0 | N | 0 | 6 | 70 | 1 | 1 | 1 | 3 | 3.5 | 70 | 0 | 50 |
| C14 | 2.5 | 0 | Y | 0 | 6 | 95 | 2.5 | 1 | 1 | 4.5 | 5 | 85 | 2 | 80 |
| C14 | 2.5 | 1.25 | N | 0 | 6 | 100 | 5 | 4 | 4 | 13 | 6 | 100 | 5 | 100 |
| C14 | 2.5 | 1.25 | Y | 0 | 6 | 100 | 5 | 5 | 5 | 15 | 6 | 100 | 5 | 100 |
| C14 | 2.5 | 1.25 | Y | 0.05 | 6 | 100 | 4.5 | 4 | 3 | 11.5 | 6 | 100 | 6 | 100 |
| C18 | 2.5 | 0 | N | 0 | 2 | 70 | 1 | 1 | 1 | 3 | 2 | 60 | 0 | 0 |
| C18 | 2.5 | 0 | Y | 0 | 3 | 80 | 2 | 2 | 2 | 6 | 5 | 100 | 2 | 80 |
| C18 | 2.5 | 1.25 | N | 0 | 5 | 100 | 5 | 5 | 4 | 14 | 6 | 100 | 5 | 100 |
| C18 | 2.5 | 1.25 | Y | 0 | 5 | 100 | 5 | 5 | 5 | 15 | 6 | 100 | 5 | 100 |
| C18 | 2.5 | 1.25 | Y | 0.05 | 5 | 100 | 4.5 | 4.5 | 4.5 | 13.5 | 6 | 100 | 6 | 100 |

TABLE 10

Nylon Fabric

| | Composition | | | | Ratings | | | | | | | | | | | | | |
|---|---|---|---|---|---|---|---|---|---|---|---|---|---|---|---|---|---|---|
| | Ester (% SOF) PCD | Melamine Catalyst | FC-2 | Initial | | Bundesman (minutes) | | | | 5 L | | 10 L | | 20 L | | 30 L | |
| | (% SOF) | Y/N | (% SOF) | O/R | Spray | 1 | 5 | 10 | Total | O/R | Spray | O/R | Spray | O/R | Spray | O/R | Spray |
| Ester A | 0.3/0 | N | 0 | 0 | 95 | 2 | 1 | 1 | 4 | 0 | 0 | NT | NT | NT | NT | NT | NT |
| Ester A | 0.6/0 | N | 0 | 0 | 95 | 2 | 2 | 1 | 5 | 0 | 0 | NT | NT | NT | NT | NT | NT |
| Ester A | 0.4/0.2 | N | 0 | 0 | 100 | 3 | 2 | 2 | 7 | 0 | 95 | NT | 80 | NT | 70 | NT | 50 |
| Ester A | 0.4/0.2 | Y | 0 | 0 | 100 | 4 | 4 | 4 | 12 | NT | 100 | NT | 90 | NT | 80 | NT | 70 |
| Ester A | 0.4/0.2 | Y | 0.05 | 2 | 100 | 5 | 5 | 4 | 14 | 2 | 100 | 0 | 95 | NT | 85 | NT | 85 |
| Ester B | 0.3/0 | N | 0 | 0 | 85 | 1 | 1 | 1 | 3 | NT | 0 | NT | NT | NT | NT | NT | NT |
| Ester B | 0.6/0 | N | 0 | 0 | 95 | 2 | 1 | 1 | 4 | NT | 0 | NT | NT | NT | NT | NT | NT |
| Ester B | 0.4/0.2 | N | 0 | 0 | 100 | 4 | 3 | 3 | 10 | NT | 95 | NT | 95 | NT | 50 | NT | 50 |
| Ester B | 0.4/0.2 | Y | 0 | 0 | 100 | 4 | 4 | 4 | 12 | NT | 100 | NT | 95 | NT | 80 | NT | 70 |
| Ester B | 0.4/0.2 | Y | 0.05 | 2 | 100 | 5 | 5 | 4 | 14 | 2 | 100 | 2 | 95 | 0 | 95 | NT | 85 |
| Ester C | 0.3/0 | N | 0 | 0 | 70 | 1 | 1 | 1 | 3 | NT | 0 | NT | NT | NT | NT | NT | NT |
| Ester C | 0.6/0 | N | 0 | 0.5 | 70 | 1 | 1 | 1 | 3 | 0 | 0 | NT | NT | NT | NT | NT | NT |
| Ester C | 0.4/0.2 | N | 0 | 0.5 | 95 | 4 | 2 | 1 | 7 | 0 | 95 | NT | 85 | NT | 80 | NT | 50 |
| Ester C | 0.4/0.2 | Y | 0 | 0 | 100 | 4 | 2 | 2 | 8 | NT | 90 | NT | 85 | NT | 85 | NT | 70 |
| Ester C | 0.4/0.2 | Y | 0.05 | 2 | 95 | 4 | 3 | 2 | 9 | 2 | 95 | 2 | 95 | 2 | 85 | 0 | 70 |

TABLE 11

Polyester Fabric

| | Composition | | | | Ratings | | | | | | | | | | | | | |
|---|---|---|---|---|---|---|---|---|---|---|---|---|---|---|---|---|---|---|
| | Ester (% SOF) PCD | Melamine Catalyst | FC-2 | Initial | | Bundesman (minutes) | | | | 5 L | | 10 L | | 20 L | | 30 L | |
| | (% SOF) | Y/N | (% SOF) | O/R | Spray | 1 | 5 | 10 | Total | O/R | Spray | O/R | Spray | O/R | Spray | O/R | Spray |
| Ester A | 0.3/0 | N | 0 | 4 | 100 | 2 | 2 | 2 | 6 | 0 | 50 | NT | NT | NT | NT | NT | NT |
| Ester A | 0.6/0 | N | 0 | 5 | 100 | 5 | 4 | 2 | 11 | 0 | 50 | NT | NT | NT | NT | NT | NT |
| Ester A | 0.4/0.2 | N | 0 | 2 | 95 | 2 | 2 | 2 | 6 | 2 | 70 | 1 | 70 | 1 | 70 | 0 | 70 |
| Ester A | 0.4/0.2 | Y | 0 | 5 | 100 | 5 | 5 | 5 | 15 | 3 | 95 | 2 | 85 | 1 | 75 | 1 | 50 |
| Ester A | 0.4/0.2 | Y | 0.05 | 5 | 100 | 5 | 5 | 5 | 15 | 4 | 95 | 3 | 75 | 2 | 70 | 1 | 70 |
| Ester B | 0.3/0 | N | 0 | 5 | 100 | 2 | 2 | 2 | 6 | 0 | 50 | NT | NT | NT | NT | NT | NT |
| Ester B | 0.6/0 | N | 0 | 5 | 100 | 5 | 5 | 5 | 15 | 0 | 50 | NT | NT | NT | NT | NT | NT |
| Ester B | 0.4/0.2 | N | 0 | 2 | 100 | 2 | 2 | 2 | 6 | 2 | 80 | 2 | 70 | 1 | 70 | 0 | 50 |
| Ester B | 0.4/0.2 | Y | 0 | 5 | 100 | 5 | 5 | 5 | 15 | 2 | 100 | 2 | 85 | 1 | 70 | 1 | 70 |

TABLE 11-continued

Polyester Fabric

| | Composition | | | Ratings | | | | | | | | | | | | |
|---|---|---|---|---|---|---|---|---|---|---|---|---|---|---|---|---|
| Ester | | Melamine Catalyst | FC-2 | Initial | | Bundesman (minutes) | | | | 5 L | | 10 L | | 20 L | | 30 L | |
| (% SOF) PCD | | | | | | | | | | | | | | | | |
| (% SOF) | Y/N | (% SOF) | O/R | Spray | 1 | 5 | 10 | Total | O/R | Spray | O/R | Spray | O/R | Spray | O/R | Spray |
| Ester B | 0.4/0.2 | Y | 0.05 | 6 | 100 | 5 | 5 | 5 | 15 | 3 | 95 | 3 | 80 | 2 | 75 | 2 | 70 |
| Ester C | 0.3/0 | N | 0 | 5 | 100 | 3 | 2 | 1 | 6 | 0 | 50 | NT | NT | NT | NT | NT | NT |
| Ester C | 0.6/0 | N | 0 | 5 | 100 | 5 | 3 | 2 | 10 | 1 | 50 | NT | NT | NT | NT | NT | NT |
| Ester C | 0.4/0.2 | N | 0 | 3 | 95 | 2 | 2 | 2 | 6 | 3 | 80 | 2 | 70 | 1 | 70 | 0 | 50 |
| Ester C | 0.4/0.2 | Y | 0 | 5 | 100 | 5 | 5 | 5 | 15 | 3 | 95 | 3 | 80 | 2 | 75 | 1 | 50 |
| Ester C | 0.4/0.2 | Y | 0.05 | 6 | 100 | 5 | 5 | 4 | 14 | 5 | 100 | 4 | 80 | 3 | 70 | 2 | 70 |

All patents, patent applications, and patent publications referred to herein are incorporated by reference in their entirety.

What is claimed is:

1. A composition comprising a blend comprising:
   (A) 50-90 wt-% of one or more oligomers wherein each oligomer comprises (i) at least one fluorine-containing repeatable unit and (ii) at least one fluorine-containing terminal group, and wherein said oligomers comprise the condensation reaction product of:
   (a) one or more fluorinated polyols selected from the group of:
   $R^fSO_2N(CH_2CH_2OH)_2$;
   $R^fSO_2N(R)CH_2CH(OH)CH_2OH$; and
   $R^fCON(CH_2CH_2OH)_2$;
   wherein:
   $R^f$ is a perfluoroalkyl group having 1 to 12 carbon atoms, or a perfluoroheteroalkyl group having 3 to about 50 carbon atoms with all perfluorocarbon chains present having 1 to 6 carbon atoms, or mixtures thereof; and
   R' is an alkyl of 1 to 4 carbon atoms;
   (b) one or more polyacyl compounds containing a straight chain alkylene group of 14 to 18 carbon atoms; and
   (c) one or more monofunctional fluorine-containing compounds comprising a functional group that is reactive with the hydroxyl group of said polyol (a) or with the acyl group of the polyacyl compounds (b); wherein the monofunctional fluorine-containing compound is a compound of the following formula (II):

$R^fQ'$ (II)

wherein:
   $R^f$ is selected from the group consisting of a perfluoroalkyl group having 1 to 12 carbon atoms, and a perfluoroheteroalkyl group having 3 to 50 carbon atoms with all perfluorocarbon chains present having 6 or fewer carbon atoms; and
   Q' is a moiety comprising a functional group that is reactive with the terminal acyl group of the polyacyl group or terminal hydroxy group of the polyol, wherein the functional group is selected from hydroxyl, oxazolinyl, oxazolonyl, acetyl, acetonyl, carboxyl, isocyanato, epoxy, aziridinyl, thio, ester, and acyl halide groups;
   wherein the ratio of component (a) to (b) to (c) is 1:0.5-0.9:0.2-1; and (B) 10-50 wt-% of one or more polycarbodiimides selected from the group of:
   PCD-1: 8 MDI/2 isostearylalcohol/(8 ODA/HDA-HSCH_2CHOHCH_2OH);
   PCD-2: 4 MDI/isostearylalcohol/(8 iBMA-HSCH_2CH_2OH);
   PCD-3: 4 MDI/0.5 isostearyl alcohol/0.5 stearylalcohol/(8 iBMA-HSCH_2CH_2OH);
   PCD-4: 4 MDI/0.5 isostearyl alcohol/0.5 behenyl alcohol/(8 iBMA-HSCH_2CH_2OH);
   PCD-5: 4 MDI/isostearyl alcohol/(4 ODA-HSCH_2CH_2OH);
   PCD-6: 5 MDI/glycerol monostearate/2 (4 MMA-HSCH_2CH_2OH);
   PCD-7: 12 MDI/(4 ODA/HDA-HSCH_2CH_2OH)/2 GMS;
   PCD-8: 12 MDI/(4 ODA/HDA-MeFBSEA-HSCH_2CH_2OH)/2 GMS;
   PCD-9: 12 MDI/(2 ODA/HDA-(2 ODI-HEMA)-HSCH_2CH_2OH)/2 GMS;
   PCD-10: 12 MDI/((4 ODI-HEMA)-HSCH_2CH_2OH)/2 GMS;
   PCD-11: 12 MDI/isostearylalcohol/(8 ODA/HDA-HSCH_2CH_2OH)/2 GMS; and
   PCD-12: 12 MDI/isostearylalcohol/(8 ODA/HDA-HSCH_2CH_2OH)/4 GMS.

2. The composition of claim 1 wherein said oligomers are of the formula (I):

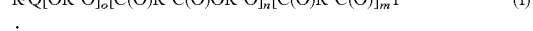

$$R^fQ[OR^2O]_o[C(O)R^1C(O)OR^2O]_n[C(O)R^1C(O)]_mT \quad (I)$$

wherein:
o is a number from 0 to 1 inclusive;
n is a number from 1 to 10 inclusive;
m is number from 0 to 1 inclusive;
$R^f$ is a perfluoroalkyl group having 1 to 6 carbon atoms;
Q is a divalent linking group derived from the one or more monofunctional fluorine-containing compounds of component (c);
$R^1$ is the same or different polyvalent organic group that is a residue of a polyacyl compound, that is a straight chain alkylene group of 14 to 18 carbon atoms;
$R^2$ is the same or different divalent organic group that is a residue of the fluorinated polyol (a), at least a portion of which are substituted with or contain one or more perfluoroalkyl groups, perfluoroheteroalkyl groups, or mixtures thereof; and
T is $R^fQ$ or a non-fluorine containing monofunctional group capable of reacting with a polyacyl compound or a polyol.

3. The composition of claim 1 wherein said oligomers are of the formula (IIIa):

 (IIIa)

wherein:
n is a number from 1 to 10 inclusive;
m is 1;
$R^f$ is a perfluoroalkyl group having 1 to 6 carbon atoms;
Q is a divalent linking group derived from the one or more monofunctional fluorine-containing compounds of component (c);
$R^1$ is a straight chain alkylene of 14 to 18 carbon atoms;
$R^2$ is a polyvalent organic group which is a residue of the fluorinated polyol (a), that is a straight or branched chain alkylene, cycloalkylene, arylene or heteroalkylene group of 1 to 14 carbon atoms, or an arylene group of 6 to 12 carbon atoms wherein at least a portion of $R^2$ groups comprise one perfluoroalkyl group, perfluoroheteroalkyl group, or mixtures thereof.

4. The composition of claim 1 wherein the oligomer comprises the condensation reaction product of one or more fluorinated polyols, one or more non-fluorinated polyols, one or more polyacyl compound, and one or more monofunctional fluorine-containing compounds.

5. The composition of claim 1 wherein the oligomer comprises the condensation reaction product of one or more fluorinated polyols, an excess amount (relative to the polyol) of one or more linear alkylene diacyl compounds, and sufficient fluorinated monoalcohols to react with the terminal acyl groups.

6. The composition of claim 1 wherein the fluorine containing group of said polyol is a perfluoroalkyl group of 6 or fewer carbon atoms.

7. The composition of claim 1 wherein the fluorine containing group of said polyol is a perfluoroalkyl group of 3 to 5 carbon atoms.

8. The composition of claim 1 wherein the fluorine containing group of said polyol is a perfluorobutyl group.

9. The composition of claim 1 wherein said fluorochemical oligomer further comprises the reaction product of one or more non-fluorinated polyols.

10. The composition of claim 1 further comprising (C) one or more additives selected from the group consisting of siloxanes; acrylate and substituted acrylate polymers and copolymers; fluorinated acrylates; N-methylolacrylamide-containing acrylate polymers; urethanes; blocked isocyanate-containing polymers and oligomers; condensates or precondensates of urea or melamine with formaldehyde; glyoxal resins; condensates of fatty acids with melamine or urea derivatives; condensation of fatty acids with polyamides and their epichlorohydrin adducts; waxes; polyethylene; chlorinated polyethylene; alkyl ketene dimers, esters, and amides; and mixtures thereof.

11. The composition of claim 1 further comprising (C) a solvent.

12. The composition of claim 1 further comprising (C) a melamine-formaldehyde condensate.

13. The composition of claim 1 wherein said composition is an aqueous solution, dispersion, or suspension.

14. An article comprising a substrate having a coating of the composition of claim 1 on one or more surfaces of said substrate.

15. The article of claim 14 wherein the substrate is selected from the group consisting of hard substrates and fibrous substrates.

16. The article of claim 14 wherein the substrate is a laminate.

17. A method of imparting repellency to a substrate comprising the steps of applying the composition of claim 1 onto one or more surfaces of said substrate.

18. The method of claim 17 further comprising curing said composition at ambient or elevated temperatures.

* * * * *

UNITED STATES PATENT AND TRADEMARK OFFICE
CERTIFICATE OF CORRECTION

PATENT NO. : 9,828,722 B2
APPLICATION NO. : 14/638244
DATED : November 28, 2017
INVENTOR(S) : Jariwala et al.

It is certified that error appears in the above-identified patent and that said Letters Patent is hereby corrected as shown below:

On the Title Page

Column 2
Page 2, (other publications), Line 2, delete "Amercian" and insert -- American --, therefor.

In the Specification

Column 1
Line 9 (approx.), after "2009" insert -- , --.

Column 4
Lines 5-6, delete "perfluoroheteralkyl" and insert -- perfluoroheteroalkyl --, therefor.

Column 4
Line 56, after "like" insert -- . --, therefor.

Column 6
Line 9 (approx.), delete "[OR]" and insert -- [OR$^2$] --, therefor.

Column 9
Line 13, delete "(2-hydroxyethyoxy)" and insert -- (2-hydroxyethoxy) --, therefor.

Column 9
Line 41, delete "(Ma)" and insert -- ($M_n$) --, therefor.

Column 13
Line 3, delete "R$^f$OR'C(O)OH," and insert -- R$^f$QR'C(O)OH, --, therefor.

Column 13
Line 20, delete "perfluorcyclohexanyl" and insert -- perfluorocyclohexanyl --, therefor.

Signed and Sealed this
Sixteenth Day of October, 2018

Andrei Iancu
*Director of the United States Patent and Trademark Office*

Column 13
Line 25, delete "perfluroalkyl" and insert -- perfluoroalkyl --, therefor.

Column 14
Lines 41-42, delete "pentaerythriol" and insert -- pentaerythritol --, therefor.

Column 17
Line 39, delete "group group" and insert -- group --, therefor.

Column 19
Line 51, delete "di-t-butylperoxyphtalate," and insert -- di-t-butylperoxyphthalate, --, therefor.

Column 20
Line 22, delete "alcanols," and insert -- alcohols, --, therefor.

Column 20
Line 28, delete "poly(oyalkylene)" and insert -- poly(oxyalkylene) --, therefor.

Column 21
Line 29 (approx.), delete "polymethylenpolyphenylisocyanate" and insert -- polymethylenepolyphenylisocyanate --, therefor.

Column 21
Line 29 (approx.), delete "DESMODURTMR" and insert -- DESMODUR™R --, therefor.

Column 23
Line 48, delete "caternary" and insert -- catenary --, therefor.

Column 23
Line 56, delete "caternary" and insert -- catenary --, therefor.

Column 24
Line 19, delete "15S30," and insert -- 15-S-30, --, therefor.

Column 24
Line 19, after "Company" insert -- . --.

Column 25
Line 37, delete "Rf" and insert -- $R^f$ --, therefor.

Column 35
Line 8, delete "Polyseter" and insert -- Polyester --, therefor.

Column 36
Line 2, delete "15S30" and insert -- 15-S-30 --, therefor.

Column 36
Line 9 (approx.), delete "Flouroalkyl" and insert -- Fluoroalkyl --, therefor.

Column 36
Line 18, delete "VAZP" and insert -- VAZO --, therefor.

Column 36
Line 42 (approx.), delete "BUNDESMAN" and insert -- BUNDESMANN --, therefor.

Column 37
Line 2 (approx.), delete "BUNDESMAN" and insert -- BUNDESMANN --, therefor.

Column 38
Line 28 (approx.), delete "BUNDESMAN" and insert -- BUNDESMANN --, therefor.

Column 38
Line 2 (approx.), Table 4, delete "BUNDESMAN" and insert -- BUNDESMANN --, therefor.

Columns 39-40
Line 3 (approx.), Table 4 cont'd, delete "Bundesman" and insert -- Bundesmann --, therefor.

Column 39
Line 29 (approx.), delete "Bundesman" and insert -- Bundesmann --, therefor.

Column 40
Line 3 (approx.), Table 8, delete "Bundesman" and insert -- Bundesmann --, therefor.

Column 41
Line 3 (approx.), Table 9, delete "Bundesman" and insert -- Bundesmann --, therefor.

Columns 41-42
Line 4 (approx.), Table 10, delete "Bundesman" and insert -- Bundesmann --, therefor.

Columns 41-42
Line 4 (approx.), Table 11, delete "Bundesman" and insert -- Bundesmann --, therefor.

Columns 43-44
Lines 4 (approx.), Table 11 cont'd, delete "Bundesman" and insert -- Bundesmann --, therefor.

In the Claims

Column 43
Line 32, in Claim 1, delete "$R^fSO_2N(R)CH_2CH(OH)CH_2OH;$" and insert
-- $R^fSO_2N(R')CH_2CH(OH)CH_2OH;$ --, therefor.